United States Patent
Hwang et al.

(10) Patent No.: US 9,859,747 B2
(45) Date of Patent: Jan. 2, 2018

(54) GARMENT DEVICE AND SYSTEM HAVING WIRELESS CHARGING FUNCTION, AND CHARGING METHOD USING THE SAME

(71) Applicant: Futureplay, Inc., Seoul (KR)

(72) Inventors: Sungjae Hwang, Seoul (KR); Jongho Kim, Seoul (KR)

(73) Assignee: Futureplay, Inc., Seoul (KR)

( * ) Notice: Subject to any disclaimer, the term of this patent is extended or adjusted under 35 U.S.C. 154(b) by 0 days.

(21) Appl. No.: 15/010,085

(22) Filed: Jan. 29, 2016

(65) Prior Publication Data
US 2017/0070078 A1 Mar. 9, 2017

(30) Foreign Application Priority Data

Sep. 8, 2015 (KR) .................. 10-2015-0127295
Dec. 7, 2015 (WO) ............... PCT/KR2015/013330

(51) Int. Cl.
*H02J 7/00* (2006.01)
*H02J 7/02* (2016.01)
*H02J 7/04* (2006.01)

(52) U.S. Cl.
CPC .............. *H02J 7/025* (2013.01); *H02J 7/027* (2013.01); *H02J 7/045* (2013.01); *H02J 2007/0096* (2013.01)

(58) Field of Classification Search
CPC .......................... H02J 7/0054; H01M 10/44
USPC ........ 320/103, 106, 108, 110, 114, 134, 162
See application file for complete search history.

(56) References Cited

U.S. PATENT DOCUMENTS

| 2002/0154518 A1* | 10/2002 | Elferich | ................. H02J 5/005 363/15 |
| 2009/0096413 A1* | 4/2009 | Partovi | ................. H01F 5/003 320/108 |
| 2011/0278943 A1 | 11/2011 | Eckhoff et al. | |

FOREIGN PATENT DOCUMENTS

| JP | 2006-287555 A | 10/2006 |
| JP | 2007-502100 A | 2/2007 |
| KR | 10-2007-0044302 A | 4/2007 |
| KR | 10-2008-0088795 A | 10/2008 |
| KR | 10-2014-0008653 A | 1/2014 |
| KR | 10-2014-0116631 A | 10/2014 |

(Continued)

OTHER PUBLICATIONS

International Search Report in Int'l App. No. PCT/KR2015/013330, dated May 27, 2016.

*Primary Examiner* — Edward Tso
*Assistant Examiner* — Aaron Piggush
(74) *Attorney, Agent, or Firm* — John H. Choi

(57) ABSTRACT

The embodiments herein achieve a system including a first mobile device; a second mobile device; a garment device; and a control unit. The garment device includes a first connection unit formed in a first area corresponding to a position on which the first mobile device is worn, a second connection unit formed at a position on which the second mobile device is worn, and a fabric cable electrically connected with the first connection unit and the second connection unit. Further, the control unit is configured to control one of a charging of the second mobile device from the first mobile device, and a charging of the first mobile device from the second mobile device based on a charging direction, wherein the charging direction is determined based on a battery information of one of the first mobile device and the second mobile device.

12 Claims, 22 Drawing Sheets

(56) References Cited

FOREIGN PATENT DOCUMENTS

KR    10-2015-0065498 A    6/2015
KR    10-1545212 B1    8/2015

* cited by examiner

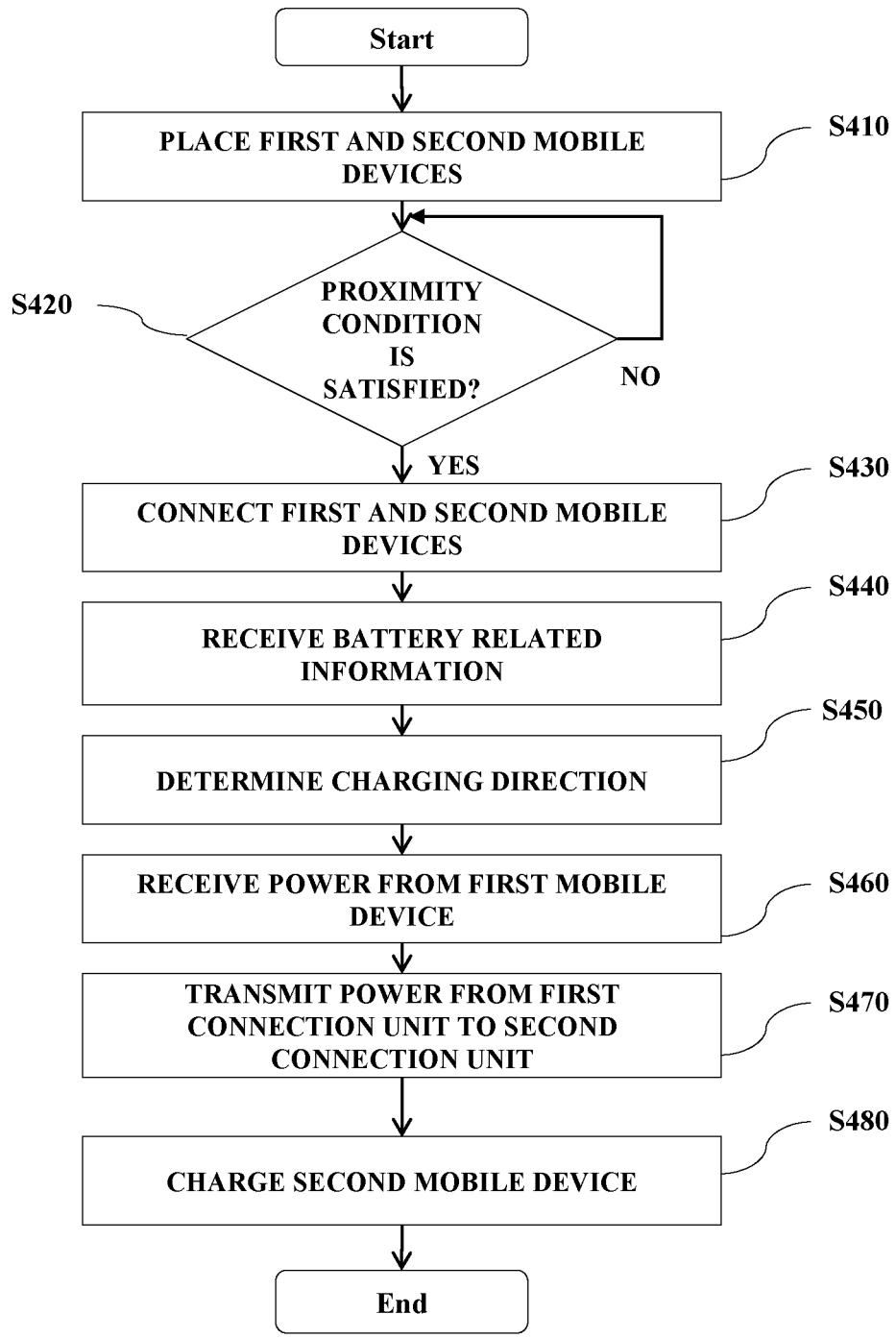

(a)

(b)

GARMENT DEVICE AND SYSTEM HAVING WIRELESS CHARGING FUNCTION, AND CHARGING METHOD USING THE SAME

CROSS-REFERENCE TO RELATED APPLICATIONS

This application claims priority to International Application No. PCT/KR2015/013330, filed on Dec. 7, 2015; and Korea Application No. 10-2015-0127295, filed on Sep. 8, 2015, from which the International application claims priority. The aforementioned applications are incorporated herein by reference.

TECHNICAL FIELD

The present invention relates to wireless charging technology. More particularly, related to a garment device and a system for charging mobile devices by electrically connecting the plurality of mobile devices to a garment worn on a body, and a method using the same.

BACKGROUND

Due to rapid development of electronic devices, sales and demands for wearable devices, such as a mobile device, particularly a smart watch, have rapidly increased. As a large capacity battery cannot be mounted in the mobile device, it is necessary to frequently charge the mobile device thereby causing inconvenience to a user. For example, the mobile device needs to be mounted on a cradle whenever being charged.

Further, according to the recent appearance of a smart garment, an issue for a battery capacity and power charging has arisen with respect to the smart garment.

Accordingly, needs for an extension of a charging period and convenient power charging of the mobile device and the smart garment have been increased.

SUMMARY OF INVENTION

Accordingly, the embodiments herein achieve a garment device including a first connection unit connected with a first mobile device; a second connection unit connected with a second mobile device; a fabric cable configured to support a power movement between the first connection unit and the second connection unit; and a communication unit configured to receive battery information of one of the first mobile device and the second mobile device. Further, the garment device includes a control unit configured to determine a charging direction based on the battery information; and control charging of the first mobile device and the second mobile device based on the charging direction.

In an embodiment, the fabric cable includes a fabric material made of an electronic thread which is capable of one of transporting an electronic material, and being charged.

In an embodiment, the second connection unit is placed on a second area of the garment device, wherein the second area is formed at a position of a body region on which the second mobile device is worn.

In an embodiment, the first connection unit is placed on a first area of the garment device, wherein the first area is formed at a position of a body region on which the first mobile device is worn.

In an embodiment, each of the first connection unit and the second connection unit is a wireless charging connection unit including a plurality of coils.

In an embodiment, the battery information contains at least one of battery charging information, battery usage information, and information about whether a wireless charging performance event is generated.

In an embodiment, control charging of the first mobile device and the second mobile device includes sensing one of a charging performance event and a stop charging event corresponding to a specific area between the first area and the second area; and perform one of charge at least one of the first mobile device and the second mobile device, corresponding to the specific area, when the charging performance event is sensed; and stop charring of at least one of the first mobile device and the second mobile device, corresponding to the specific area, when a stop charging event is sensed.

In an embodiment, when a user wears the garment device and other garment device, the control unit is configured to perform a wireless charging according to overlapping of the first connection unit and a connection unit of the other garment device.

In an embodiment, the control unit is configured to determine whether to perform charging by utilizing user authentication information of the garment device, the first mobile device, and the second mobile device.

Accordingly the embodiments herein achieve a system including a garment device and a control unit. In an embodiment, the garment device includes a first connection unit formed in a first area corresponding to a position on which a first mobile device is placed, a second connection unit formed at a position on which a second mobile device is placed, and a fabric cable electrically connected with the first connection unit and the second connection unit. In an embodiment, the control unit is configured to control one of a charging of the second mobile device from the first mobile device, and a charging of the first mobile device from the second mobile device based on a charging direction. In an embodiment, the charging direction is determined based on a battery information of one of the first mobile device and the second mobile device.

In an embodiment, when at least one of the first mobile and the second mobile device satisfies a proximity condition for a corresponding area between the first area and the second area, the control unit is configured to control at least one of the first mobile device and the second mobile device to execute a charging related application.

In an embodiment, when the first mobile device and the second mobile device satisfy a proximity condition for the first area and the second area, the garment device sets a charging standby mode for the first mobile device and second mobile device.

In an embodiment, the control unit is installed within the first mobile device.

In an embodiment, the first area is corresponding to the position on which the first mobile device is worn.

In an embodiment, the second area is corresponding to the position on which the second mobile device is worn.

Accordingly the embodiments herein achieve a system including a first mobile device, a second mobile device, a garment device, and a control unit. In an embodiment, the garment device includes a first connection unit formed in a first area corresponding to a position on which a first mobile device is placed, a second connection unit formed at a position on which a second mobile device is placed, and a fabric cable electrically connected with the first connection unit and the second connection unit. In an embodiment, the control unit is configured to control one of a charging of the second mobile device from the first mobile device, and a charging of the first mobile device from the second mobile device based on a charging direction. In an embodiment, the charging direction is determined based on a battery information of one of the first mobile device and the second mobile device.

In an embodiment, at least one of the first and second mobile devices includes a display, which displays an execution screen of the charging related application.

In an embodiment, wherein the execution screen includes at least one of a battery charging information and a battery use quantity information.

In an embodiment, wherein each of the first mobile device and the second mobile device includes an input unit which receives a user input related to the charging.

In an embodiment, wherein at least one of the first mobile device and the second mobile device receives a user input related to at least one of a setting and release of a charging standby mode, a setting and release of a charging activation mode, and a setting and release of a charging through the input unit.

Accordingly, the embodiments herein achieve a charging method including receiving a battery information from one of the first mobile and a second mobile device, wherein the first mobile device is connected to a first connection unit placed in a first area of a garment unit and the second mobile device is connected to a second connection unit placed in a second area of the garment unit. Further, the charring method includes determining a charging direction based on the battery information; and controlling the second mobile device to be charged from the first mobile device based on the charging direction.

In an embodiment, controlling the second mobile device to be charged from the first mobile device based on the charging direction includes setting a wireless charging standby mode for the first mobile device and the second mobile devices, when the first mobile device and the second mobile device satisfy a proximity condition for the first area and the second area; and setting a wireless charging activation mode for the second mobile device, when a wireless charging trigger command is received from the second mobile device.

In an embodiment, controlling the second mobile device to be charged from the first mobile device based on the charging direction includes sensing body information; receiving power from at least one of the first mobile device and the second mobile device; and transmitting the sensed body information to at least one of the first mobile device and the second mobile device by using power received from at least one of the first mobile device and the second mobile device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which:

FIG. 4 is a flowchart illustrating a wireless charging method using the garment device and the mobile device, according to the embodiments as disclosed herein;

DETAILED DESCRIPTION OF INVENTION

Figure 1:
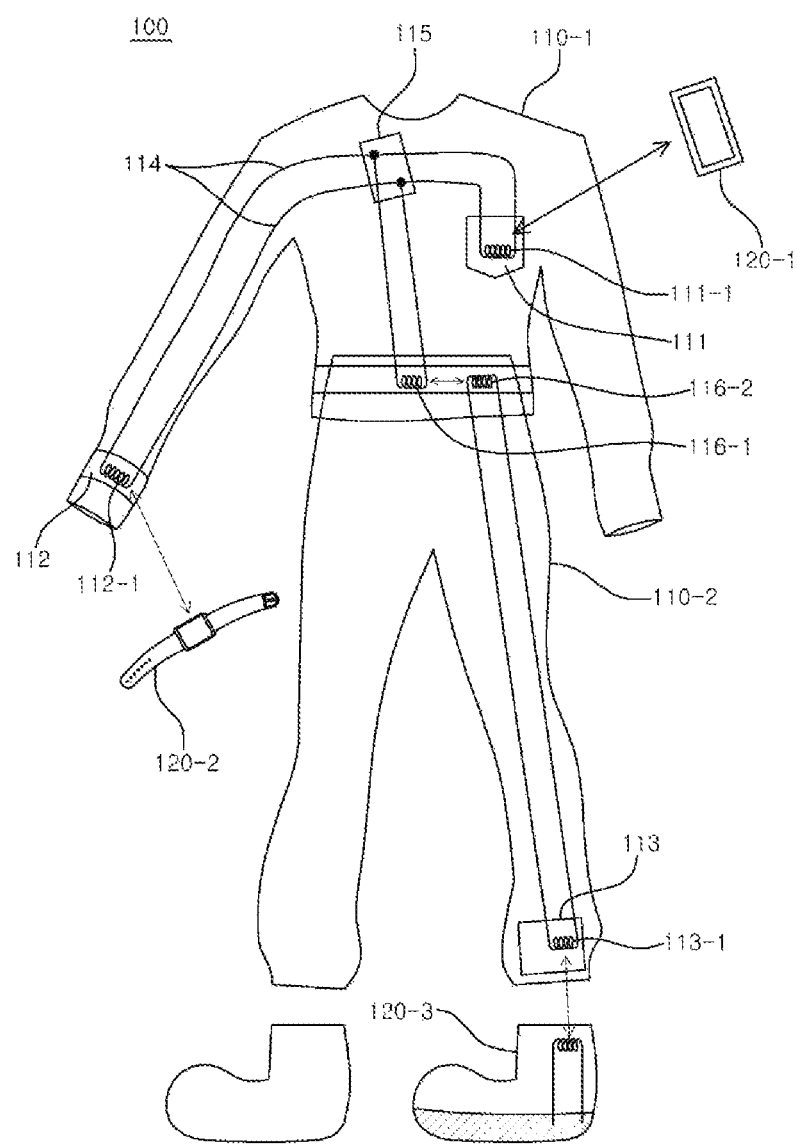
FIG. 1 is a diagram illustrating a wireless charging system including a garment device and a plurality of mobile devices and configuration thereof, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

An object of the embodiments herein is to provide a mechanism for charging a garment device and a mobile device connected to the garment device.

Another object of the embodiments herein is to provide a mechanism for receiving power from any one mobile device through a garment device so as to charge another mobile device.

Yet another object of the embodiments herein is to provide a mechanism for sharing predetermined information between a garment device and a mobile device or between mobile devices.

Accordingly, the embodiments herein achieve a garment device including a first connection unit connected with a first mobile device; a second connection unit connected with a second mobile device; a fabric cable configured to support a power movement between the first connection unit and the second connection unit; and a communication unit configured to receive battery information of one of the first mobile device and the second mobile device. Further, the garment device includes a control unit configured to determine a charging direction based on the battery information; and control charging of the first mobile device and the second mobile device based on the charging direction.

Accordingly the embodiments herein achieve a system including a garment device and a control unit. In an embodiment, the garment device includes a first connection unit formed in a first area corresponding to a position on which a first mobile device is placed, a second connection unit formed at a position on which a second mobile device is placed, and a fabric cable electrically connected with the first connection unit and the second connection unit. In an embodiment, the control unit is configured to control one of a charging of the second mobile device from the first mobile device, and a charging of the first mobile device from the second mobile device based on a charging direction. In an embodiment, the charging direction is determined based on a battery information of one of the first mobile device and the second mobile device.

Accordingly the embodiments herein achieve a system including a first mobile device, a second mobile device, a garment device, and a control unit. In an embodiment, the garment device includes a first connection unit formed in a first area corresponding to a position on which a first mobile device is placed, a second connection unit formed at a position on which a second mobile device is placed, and a fabric cable electrically connected with the first connection unit and the second connection unit. In an embodiment, the control unit is configured to control one of a charging of the second mobile device from the first mobile device, and a charging of the first mobile device from the second mobile device based on a charging direction. In an embodiment, the charging direction is determined based on a battery information of one of the first mobile device and the second mobile device.

Accordingly, the embodiments herein achieve a charging method including receiving a battery information from one of the first mobile and a second mobile device, wherein the first mobile device is connected to a first connection unit placed in a first area of a garment unit and the second mobile device is connected to a second connection unit placed in a second area of the garment unit. Further, the charring method includes determining a charging direction based on the battery information; and controlling the second mobile device to be charged from the first mobile device based on the charging direction.

Unlike the conventional system, according to the present invention, it is possible to charge a mobile device by receiving power from another mobile device connected to a garment device without separating the mobile device from a body. The proposed mechanism can be used to separately charging the mobile device thereby providing an effect of substantially extending a charging period of the mobile device.

Further, according to the present invention, it is possible to share power information between mobile devices connected to a garment device through the garment device, thereby not requiring a separate operation for connecting the mobile devices to each other.

Referring now to the drawings and more particularly to FIGS. 1 to 20 where similar reference characters denote corresponding features consistently throughout the figures, there are shown preferred embodiments.

A garment device described herein may include a garment formed of a fabric material made of an electronic thread or a conductive thread, which is capable of transporting an electronic material or being charged. Particularly, the garment device may be utilized as a connection unit, which will be described below, by inserting an antenna pattern (or a coil pattern), which conforms to a wireless power consortium (WPC) wireless charging standard or a power matters alliance (PMA) wireless charging standard into a specific area (for example, a pocket, a sleeve, a waist region, or the like) of the garment. However, it is necessary to insert the antenna pattern so as to be smoothly connected with the connection unit of the garment device in a condition where mobile or wearable devices are naturally worn (including a state where a mobile device is inserted in a pocket). Further, the garment device may be configured to surround at least one of an upper body and a lower body of a user with a plurality of surfaces thereof. Further, the garment device may be manufactured in various forms, such as a shirt, trousers, a skirt, a hat, a bag, an arm warmer, or the like.

A mobile device described herein may include a communication means transceiving information with an external device. The communication means includes a wired or wireless communication standard. A non-limiting example of a wired communication standard can include a universal serial bus (USB). A non-limiting example of a wireless communication standard can include a near field communication (NFC). Further, the aforementioned communication means also includes a communication channel for negotiating a voltage, a current, a charging direction, and the like through the wireless or wired communication. Further, the aforementioned communication means also includes a communication interface defined in the Qi standard, which is a wireless charging standard. For example, the mobile device may include at least one of a smart watch, smart glasses, a smart belt, a smart bag, smart shoes, a smart hat, a portable auxiliary battery, or the like. Further, the mobile device may be configured as a wearable device surrounding a specific region (such as a wrist, a foot, a shoulder, a waist, a face, a head, or the like) in a body of a user with a plurality of surfaces thereof when the user wears the mobile device. Further, the mobile device may include an input unit receiving a user input such as, for example, all types of inputs including a touch input, a gesture input, a voice input, or the like related to wireless charging.

FIG. 1 is a diagram illustrating a wireless charging system 100 including a garment device 110-1 and 110-2 and a plurality of mobile devices 120-1 to 12-3 and configuration thereof, according to the embodiments as disclosed herein. Here, examples of the garment device may include an upper garment and a lower garment, and the mobile device may include a cellular phone, a smart watch, and smart shoes. In an embodiment, the charging system 100 according to the present invention includes the garment devices 110-1 and 110-2 connected with the plurality of mobile devices 120-1 to 12-3 to support the wireless charging. FIG. 1 illustrates the plurality of mobile devices and the garment devices for describing various example embodiments, but charging may also be available by using one garment device.

The garment devices 110-1 and 110-2, according to the present invention, are connected with the plurality of mobile devices 120-1 to 120-3 through a plurality of connection units 111-1 to 113-1 provided in a plurality of areas 111 to 113, respectively. In this case, it is possible to use power received from one mobile device so as to wirelessly charge another mobile device according to a charging direction determined based on information related to batteries of the plurality of mobile devices 120-1 to 120-3.

For example, the first connection unit 111-1 may be located in a pocket of the upper garment 110-1 and wired or wirelessly connected with a cellular phone such as the first mobile device 120-1. The second connection unit 112-1 may be located on a sleeve of the upper garment 110-1 and wired or wirelessly connected with a smart watch such as the second mobile device 120-2. Further, the third connection unit 113-1 may be located at a lower end of the lower garment 110-2 and wired or wirelessly connected with a smart shoe such as the third mobile device 120-3. In this case, in order to connect the upper garment 110-1 and the lower garment 110-2, which mainly control a charging operation, a connection unit 116-1 of the upper garment 110-1 and a connection unit 116-2 of the lower garment 110-2 may be separately provided.

Here, a connection area may correspond to a specific region of a body worn with the garment device and a corresponding mobile device. For example, the first mobile device 120-1 may correspond to the first area 111, and the second mobile device 120-2 may correspond to the second area 112. Further, the connection area may also include at least one of an energy storing unit (or a battery), a sensor unit, a communication unit, and a control unit, as well as the connection unit.

Particularly, each of the first and second areas may be disposed so that the garment devices and the mobile devices are electrically and wirelessly connected at natural and general wearing positions. For example, the first area or the second area may be disposed at a wrist region corresponding to a position, on which a smart watch is generally worn. The first area or the second area may be disposed at a pocket portion of the garment device in a form of a shirt or trousers, in which a smart phone is portable. Otherwise, the first area or the second area may be disposed in a shoulder region of the garment device in a form of a shirt so as to be connected to a shoulder strap region of a smart back pack.

Further, the garment devices 110-1 and 110-2 may further include a fabric cable 114 supporting power movement between the plurality of connection units 111-1 to 113-1, and may further include a control unit 115 controlling a charging operation. In the present example embodiment, it is illustrated that the control unit 115 is included in the garment device 110-1, but the mobile device may also include the control unit 115. For example, the control unit 115 may be included in the first mobile device 120-1 or the second mobile device 120-2. In this case, the garment devices 110-1 and 110-2 may be formed of only passive elements such as the fabric cable 114 and the connection unit 111.

Here, the fabric cable 114 may connect the plurality of connection areas (or the plurality of connection units), or connect a specific connection area with the energy storing unit (battery), control unit, sensor unit, communication unit, or the like provided in the garment device. Further, the fabric cable 114 may be in a form of an electronic thread or a conductive thread formed of a material, which is the same as or similar to a fabric material. The fabric cable 114 may store power as a cable battery, or directly store or transceive information received from the mobile device. Further, the fabric cable may include all of the forms combined with a fabric material through a means (for example, a metal) for forming an interface between the garment device and the mobile device.

Here, in an embodiment, the control unit 115 may be provided in a specific area or a separate portion different from the specific area and be electromagnetically connected with the connection unit.

Figure 2:
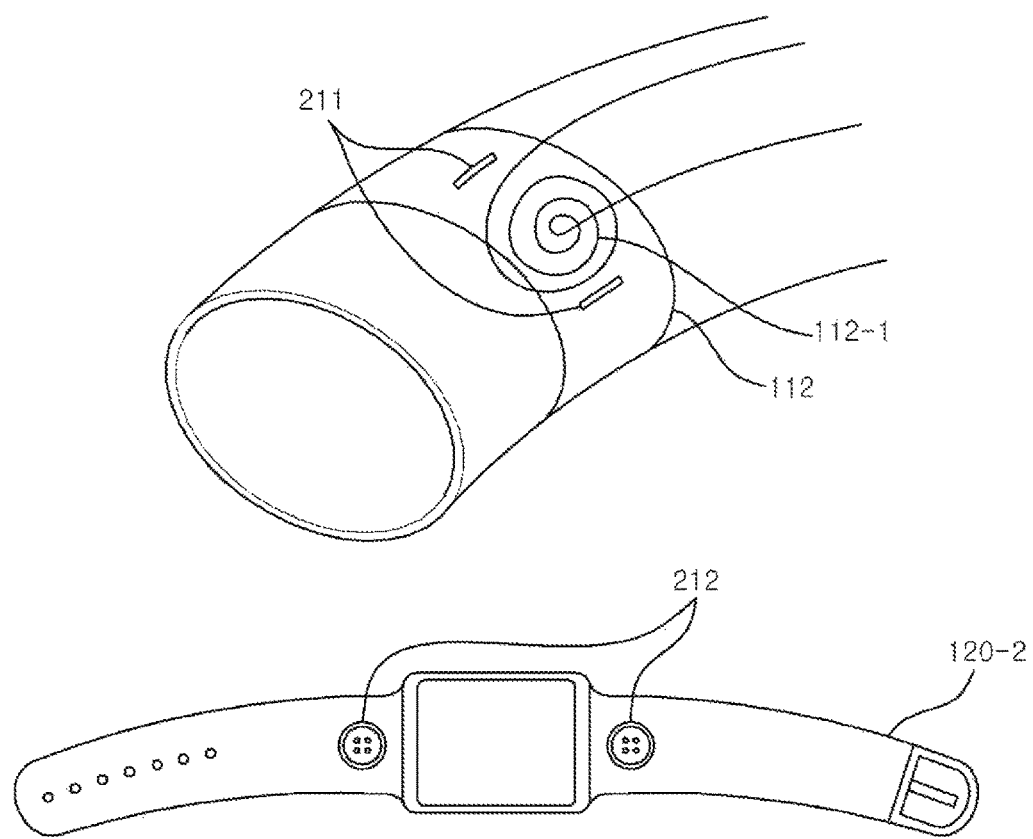
FIG. 2 illustrates a wireless connection of a connection unit of the garment device and the mobile device corresponding to the connection unit, according to the embodiments as disclosed herein.

FIG. 2 illustrates a wireless connection of the connection unit of the garment device and the mobile device corresponding to the connection unit, according to the embodiments as disclosed herein. For convenience of description, it is assumed that the second mobile device 120-2 corresponding to the second area 112 is a smart watch.

The garment device 110-1 may include accommodating parts 211 at a sleeve thereof. The smart watch 120-2 may include protrusions 212 coupled with the accommodating parts 211. According to the coupling of the accommodating parts 211 and the protrusions 212, the second connection unit 112-1 provided in the second area 112 and the smart watch 120-2 may be aligned at accurate positions and wirelessly connected. Accordingly, the accommodating parts 211 and the protrusions 212 may perform a physical guide function so as to satisfy a proximity condition to be described below. For example, the accommodating part 211 may be implemented as a button hole and the protrusion 212 may be implemented as a button. Otherwise, for example, when a pocket is provided with a wirelessly connectable connection unit, a width of the pocket may be set to satisfy the proximity condition to be described below when a cellular phone is naturally accommodated in the pocket. That is, two lateral surfaces of the pocket may perform a physical guide function.

Particularly, in a case of the connection unit in the form of the coil, the connection unit may include a plurality of coils having the same pattern or different patterns. For example, a power transceiving device formed of the plurality of coils (which is an example of the connection unit in the form of the coil) may include a shield for a magnetic field in a direction of a body thereof. The power transceiving device is made of a shield made of a solid material so as to maximally prevent a contact surface of an antenna from being bent.

Figure 3A:
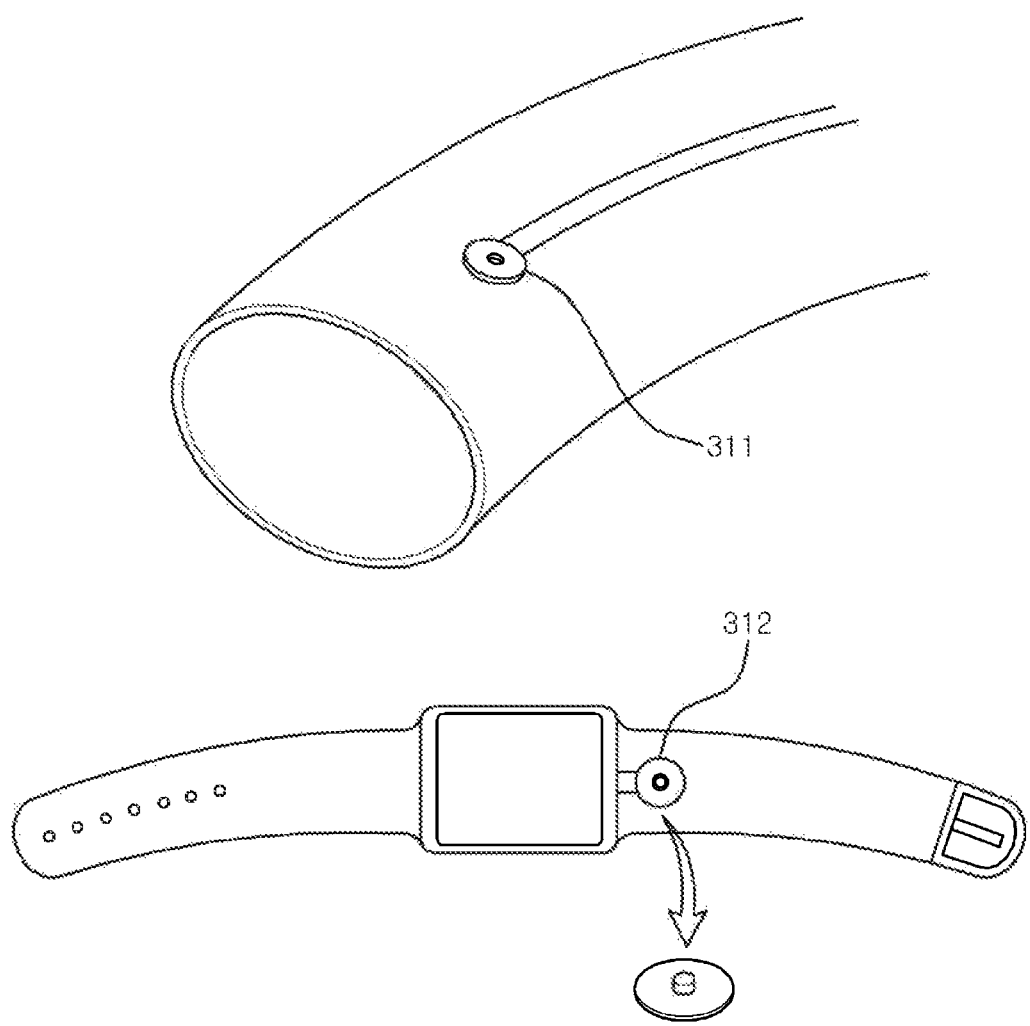
FIGS. 3A to 3C illustrate a wired connection of a connection unit of a garment device and the mobile device corresponding to the connection unit, according to the embodiments as disclosed herein.
Figure 3B:
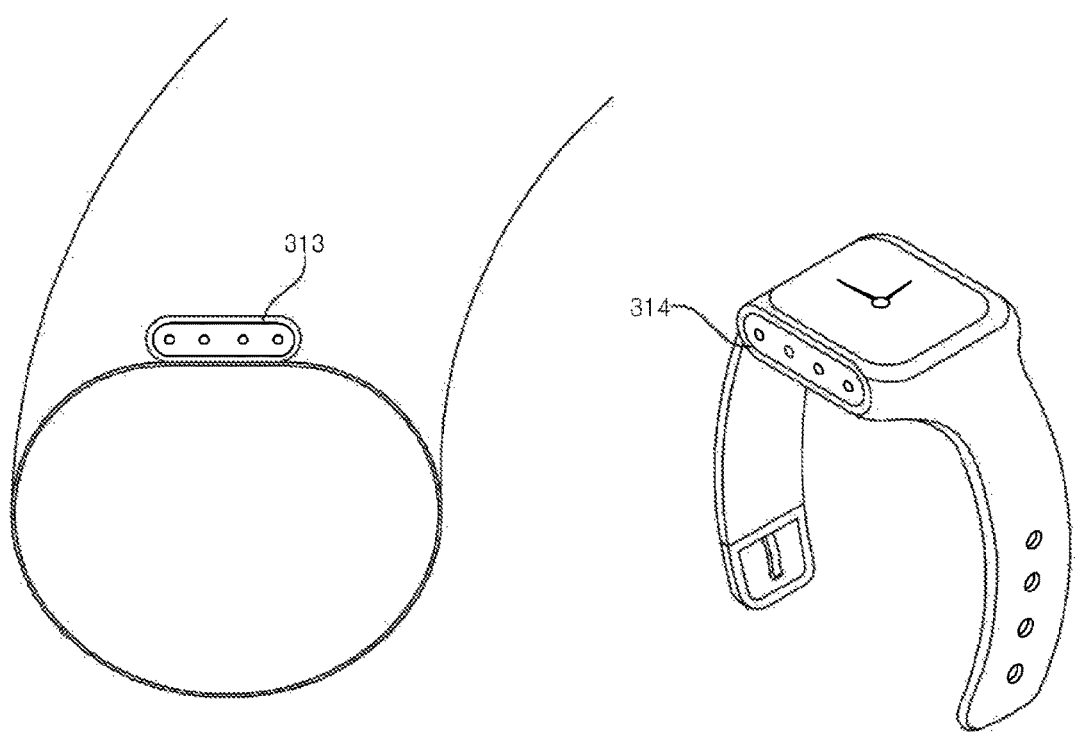
Figure 3C:
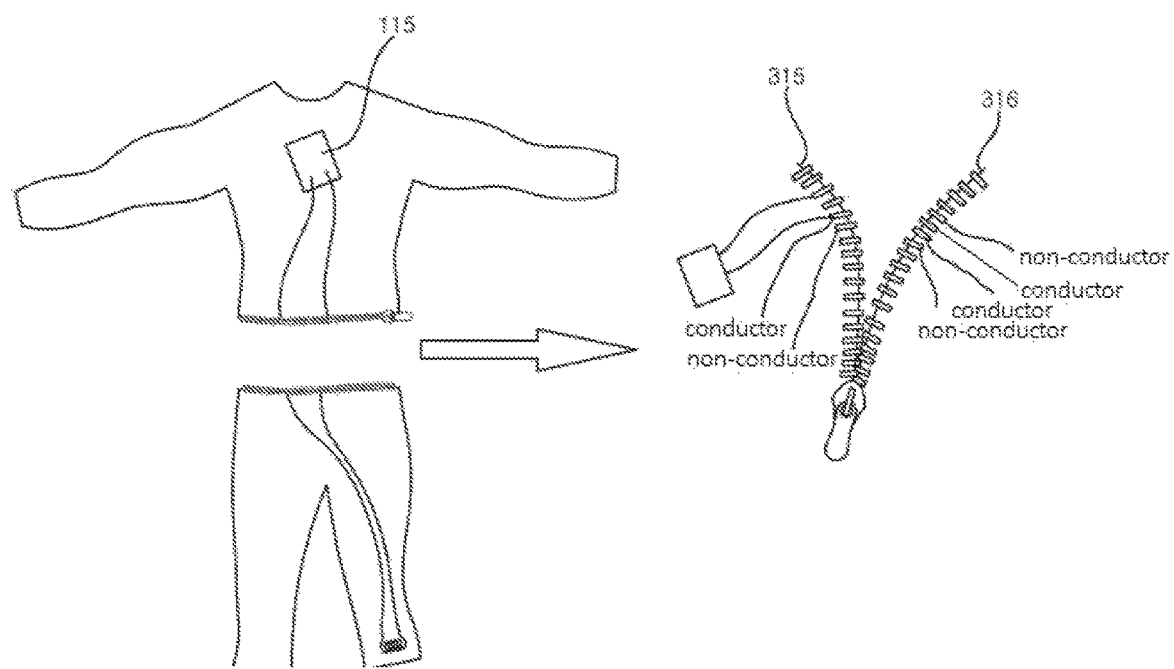

FIGS. 3A to 3C illustrate a wired connection of the connection unit of the garment device and the mobile device corresponding to the connection unit, according to the embodiments as disclosed herein. For convenience of description, it is assumed in the FIGS. 3A and 3B that the mobile device is a smart watch.

Referring to the FIG. 3A, the sleeve is provided with a button concave portion 311, and the smart watch is provided with a button convex portion 312. When the concave portion 311 is coupled with the convex portion 312, the connection unit may be wired or wirelessly connected with the smart watch.

Referring to the FIG. 3B, a first connector 313 and a second magnetic connector 314 are provided in a part of the sleeve and the smart watch. When the first and second magnetic connectors 313 and 314 are coupled with each other, the connection unit may be wiredly connected with the smart watch.

Referring to the FIG. 3C, first and second connectors 315 and 316 are provided in a lower end of an upper garment and an upper end of a lower garment, respectively, and when the first and second connectors 315 and 316 are coupled with each other, the upper garment and the lower garment may be wiredly connected with each other. Accordingly, a mobile device connected through the lower garment (for example, a smart shoe) may be connected with the control unit 115 provided in the upper garment or other mobile devices connected to the upper garment. The first and second connectors are formed in a form of a zipper. In this case, as illustrated in the FIG. 3C, conductive teeth and non-conductive teeth are alternately disposed to prevent a signal from being leaked. For example, four conductive teeth among the plurality of teeth of the zipper may correspond to four pins of the USB standard.

FIG. 4 is a flowchart illustrating a wireless charging method using the garment device and the mobile device, according to the embodiments as disclosed herein.

For the convenience of description, it is assumed that the garment device means the first garment device 110-1 of the FIG. 1, and the mobile device means first and second mobile devices 120-1 and 120-2 of the FIG. 1. Further, it is assumed that a charging direction to be described below is from the first mobile device 120-1 to the second mobile device 120-2 (a reverse direction thereof is also available).

In order to perform the operations illustrated in the FIG. 4, the garment device 110-1, according to the present invention, may include the first and second connection units 111-1 and 112-1 provided in the first and second areas 111 and 112, respectively. The first and second connection units 111-1 and 112-1 connected with the first and second mobile devices 120-1 and 120-2 corresponding to the first and second areas 111 and 112, respectively. The garment device 110-1 can include the fabric cable 114 supporting a power movement between the first and second connection units 111-1 and 112-1, a communication unit (not illustrated) receiving information related to first and second batteries from the first and second mobile devices 120-1 and 120-2, respectively, and the control unit 115 controlling the first connection unit 111-1 so as to receive the power from the first mobile device 120-1 in a charging direction determined according to the information related to the first and second batteries and controlling the second connection unit 112-1 so as to wirelessly charge the second mobile device 120-2 by receiving power from the first connection unit 111-1. In this case, the first and second areas 111 and 112 may corresponding to a first and second body regions, on which the first and second mobile devices 120-1 and 120-2 are worn, respectively.

Here, at least one of a position and an area of the first or second area 111 or 112 may be set to correspond to at least one of the kind and a wearing form of the corresponding mobile device. For example, when the second mobile device 120-2 is a smart watch, the second area 112 may be set at a sleeve of the garment device corresponding to a wrist, on which the smart watch is to be worn. Otherwise, a position or an area of the second area 112 may be set to be proximate to the smart watch within a predetermined distance according to a wearing form, such as a case where the garment device covers an upper portion of the worn smart watch or a case where the garment device crosses a strap region of the smart watch.

Here, the first and second connection units 111-1 and 112-1 may be formed of a material, which is the same as or similar to a fabric material, and coupled with the garment device, or may be formed of a metal material, such as copper, and include a physical structure detachable from the fabric material of the garment device. Particularly, when the form of the connection unit is a coil, the plurality of coils may include a plurality of pattern types, and be disposed so as to have a predetermined rule (for example, a predetermined interval).

Referring to the FIG. 4, a user wears the first and second mobile devices in a state of wearing the garment device (S410).

The garment device determines whether the first or second mobile device satisfies a proximity condition for the first or second area (S420). More particularly, the determination operation S420 may be performed by the control unit 115.

For example, the garment device is a form, in which the corresponding mobile device is proximate to or in contact with the corresponding area of the garment device within a predetermined distance (it is assumed that the mobile device is a smart watch, a smart bag, a smart phone, or a smart shoes, and the area is a sleeve, a pocket, a shoulder portion, a bottom end of a trouser, or a specific portion of a belt). The garment device may determine that the corresponding mobile device satisfies the proximity condition when the sleeve covers the smart watch, a strap of the smart bag is laid on the shoulder portion of the upper garment, the smart phone is positioned within a pocket, the smart shoe is in contact with the lower end of the trouser, or the smart watch is in proximate to the specific portion of the belt.

Further, the garment device may determine whether the mobile device satisfies the proximity condition by using a proximity sensor, such as a luminance sensor and an image sensor, which is embedded in the garment device (or the mobile device), or a geomagnetic sensor sensing a geomagnetic sensor value variation of the connection unit by the proximity of the mobile device.

Further, the proximity condition may be determined in consideration of a position of a corresponding area, the kind or wearing form of corresponding mobile device, the form of the connection unit, or the like. For example, a setting value of the proximity condition may be different for "the sleeve and the smart watch" and "the smart bag and the sleeve portion of the upper garment". Otherwise, for example, when the connection unit is a wired connection unit, the garment device may determine that the mobile device satisfies the proximity condition when the wired connection units are electrically connected with each other.

In order to measure whether the mobile device satisfies the proximity condition, a separate sensor may also be required. For example, whether the mobile device satisfies the proximity condition may be confirmed by utilizing an infrared proximity sensing sensor or the like. Otherwise, the communication means itself may be used. The control unit 115 may determine that the mobile device satisfies the proximity condition even when the mobile device is within coverage of the communication unit (not illustrated) of the garment device, and thus the mobile device responds to a signal transmitted by the garment device. Otherwise, the control unit 115 may determine that the mobile device satisfies the proximity condition when the wired connection units are in contact with each other as described above. Otherwise, the control unit 115 may determine that the mobile device satisfies the proximity condition when the mobile device is within a predetermined distance by utilizing intensity of the signal, for example, received signal strength indication (RSSI) of the communication means. Otherwise, the control unit 115 may also determine that the mobile device satisfies the proximity condition when a distance is divided into several stages, such as within several centimeters (immediate), within several meters (near), and 10 meters or more (far), based on reception sensitivity and a distance between the two devices is defined to be within a predetermined stage, like the iBeacon. In addition, those skilled in the art may determine the proximity condition by various methods.

Hereinafter, the description will be made on the assumption that all of the first and second mobile devices satisfy the proximity condition.

When the garment device determines that the first and second mobile devices satisfy the proximity condition (YES in operation S420), the garment device connects the first and second mobile devices through the first and second connection units (S430). That is, the garment device may connect the mobile device satisfying the proximity condition. Further, in the connection operation S430, the garment device may set the first and second mobile devices to be in a wireless charging standby mode.

In the wireless charging standby mode, the first or second mobile device may execute a wireless charging related application, and display an execution screen of the wireless charging related application through a display.

For example, the user may check charging information (for example, a charging residue and a use residual time corresponding to the currently executed application) about the first or second mobile device through an execution screen. Otherwise, the user may set a wireless charging power quantity, a wireless charging time, a wireless charging operation time, or the like so as to wirelessly charge power as much as the quantity that the user desires through the execution screen.

Further, in the wireless charging standby mode, the first or second mobile device may guide a posture of the user and the like for wireless charging efficiency through the execution screen of the wireless charging related application. For example, the first or second mobile device may visually guide a body posture or a position of the mobile device, which is efficient to the wireless charging, through the execution screen, or may provide an alarm so as to maintain a posture during the wireless charging.

Further, the execution screen related to the wireless charging application may also be provided through an area corresponding to the corresponding mobile device. For example, the execution screen may be projected onto the sleeve by adjusting resolution, brightness intensity, or the like of the display of the smart watch covered by the sleeve, or projection is available on a region of the body around the sleeve by utilizing a projector.

In the meantime, when the garment device includes the control unit 115, the control unit 115 of the garment device may transmit information related to the charging to the display of the mobile devices 120-1 or 120-2. When the mobile device 120-1 or 120-2 includes the control unit 115, the mobile device 120-1 or 120-2 may directly collect and display information related to the charging.

The garment device receives information related to first and second batteries from the first and second mobile devices, respectively (S440). More particularly, the reception operation S440 may be performed by the communication unit (not illustrated) of the garment device. Furthermore, the received information related to the first and second batteries may be exchanged between the first and second mobile devices.

Here, the information related to the battery is information directly/indirectly related to the battery of the corresponding mobile device, and may contain battery charging information, battery use quantity information, whether an event corresponding to performance of wireless charging is generated, or the like. For example, the information related to the battery may contain charging information equal to or less than a threshold point (for example, a charging quantity and residual time), a battery use quantity increase trend according to an increase in the number of currently executed applications, an event appropriate to perform wireless charging (particularly, a detection of an event, such as the user sleeps, sits, or stands, through a biosensor, SNS, or predetermined information), a predetermined command related to the battery input into the corresponding mobile device (particularly, an input of a gesture or a voice sensed by the corresponding mobile device), or the like.

Further, the first or second mobile device may generate a wireless charging trigger command based on the information related to the battery and transmit the generated wireless charging trigger command to the garment device. Further, the first or second mobile device may also generate the wireless charging trigger command based on the exchanged information related to the battery.

For example, when a charging residue of the mobile device itself is equal to or less than a threshold value, this is a situation requiring wireless charging, so that the mobile device may generate the wireless charging trigger command. In another example, when the exchanged charging residue of the counterpart mobile device is equal to or larger than that of the corresponding mobile device by a predetermined level, the corresponding mobile device may generate the wireless charging trigger command.

Furthermore, the first or second mobile device may provide feedback for the information related to the battery through a visual, audible, or tactile providing means according to the execution of the wireless charging related application. For example, when the charging residue of the corresponding mobile device is equal to or less than a threshold point, the corresponding mobile device may provide a notification for the charging residue.

Further, when the garment device receives the wireless charging trigger command from the mobile device, the garment device may set a wireless charging activation mode for the mobile device generating the wireless charging trigger command. More particularly, the garment device may automatically set the wireless charging activation mode when generating the wireless charging trigger command, or set the wireless charging activation mode in response to an input operation from the user. For example, the user garment device may automatically set the wireless charging activation mode when generating the wireless charging trigger command, or set the wired space, a voice input, or the like.

Hereinafter, for convenience of description, it is assumed that the second mobile device generates the wireless charging trigger command. It is a matter of course that when the garment device receives the wireless charging trigger command from the first mobile device, the garment device may set the wireless charging activation mode for the first mobile device.

The garment device determines a charging direction based on the information related to the first and second batteries (S450). More particularly, the control unit 115 may determine that the second mobile device, in which the wireless charging activation mode is set, requires wireless charging, and determine a charging direction from the first mobile device to the second mobile device.

In order to determine the charging direction, the control unit 115 may utilize the information related to the batteries received from the first mobile device and the second mobile device. For example, the information related to the battery may contain at least one of information related to a battery consumption speed, information related to the charging quantity, and information on a charging pattern or charging context of the user.

Here, the information related to the battery consumption speed may contain, for example, information about a currently executed application or information about a physical battery consumption speed. The control unit 115 may determine the charging direction from the device having a large battery consumption speed, to the device having a small battery consumption speed based on the information related to the battery consumption speed.

Further, information related to a relative charging quantity may contain, for example, a total capacity of the battery, a current charging rate, or the like. The control unit 115 may calculate a charging capacity by multiplying a total capacity and a charging rate in consideration of a total capacity and a current charging rate of a battery of each device and determine the charging direction from the device having a large charging capacity to the device having a small charging capacity. Otherwise, the control unit 115 may determine the charging direction from the device having a large charging rate to the device having a small charging rate only in consideration of only the current charging rate.

The information about the charging pattern of the user may include a charging frequency, or the like. When the charging frequency, for example, the average number of times of charging of one day, of the user is large, the control unit 115 may determine the charging direction from the device having a large charging frequency to the device having a small charging frequency.

The information about the charging context may be, for example, schedule information, location information, or a garment wearing pattern.

Here, an example of determining the charging direction by using the schedule information and the location information is described below.

First, the control unit 115 determines whether an environment is an environment, in which wireless charging is available. In this case, the control unit 115 determines or predicts a wireless charging environment or the like according to an amount of action, an activity pattern, and a place related to the recognized schedule by utilizing a registered schedule (calendar) and location information about the user. Further, the control unit 115 determines a wireless charging operation mode of the garment device according to the determined or predicted wireless charging environment. Here, the wireless charging operation mode may include a power saving mode, a normal wireless charging mode, and a rapid wireless charging mode.

For example, when the control unit 115 may determine the charging direction from a mobile phone to a smart watch at one time, at which the amount of physical action of the user is small and it is determined that a possibility in that the garment is in contact with the mobile device, such as the smart watch or the like is high. It is assumed that a customer meeting is scheduled in a conference room at 1:00 pm tomorrow. Since the customer meeting does not require a large amount of action, and the user mainly wears a long sleeve dress suit during the customer meeting, the control unit 115 may determine that this is a condition satisfying the proximity condition, under which the garment device and the smart watch are chargeable. In this case, the control unit 115 may determine the charging direction so that the smart watch used for the purpose of health tracking is charged from the mobile phone. Further, when the mobile phone and the smart watch are connected to the garment device at the scheduled 1:00 pm with reference to the customer meeting and the schedule information, the control unit 115 may determine the charging direction so that the smart watch is charged from the battery of the mobile phone and control the charging to be started.

Further, the control unit 115 may also determine the charging direction according to a device use pattern. In this case, the control unit 115 is configured to recognize a device use pattern of the user for each time or place. Accordingly, the control unit 115 may control the device, which is mainly used at a specific place and specific time, to be wirelessly charged with power of the device, which is not mainly used at the specific place and specific time. For example, it is assumed that the user mainly does morning exercise between 6:00 am to 7:00 am. The control unit 115 may recognize an exercise time and place of the user and determine the charging direction from the mobile phone, which is not mainly used during the exercise, to the smart watch, which is mainly used during the exercise. Otherwise, when the user mainly uses the mobile phone at the closing time, the control unit 115 may control all of the power of the smart watch to be transmitted to the mobile phone before a predetermined time of the closing time.

Otherwise, the charging context information may be information indicating whether the device is easily chargeable at a specific place. In this case, the control unit 115 may determine the charging direction so that the charging is performed on the device, which is not easily chargeable at the specific place. For example, when the control unit 115 recognizes that the smart watch is present within a smart car, the control unit 115 may set that the smart watch is a device which is difficult to be charged in a driving situation. In this case, the control unit 115 may determine the charging direction so that the smart watch is charged from another device connected to the garment device.

Otherwise, the charging context information may include a garment wearing pattern.

When the control unit 115 recognizes a garment wearing pattern, it may be assumed that the user wears a plurality of garments and some of the plurality of garments are the garment devices. In this case, the control unit 115 of the garment device may sense a put on/off situation of the garment and determine a direction of wireless charging based on the sensed put on/off situation of the garment. For example, the control unit 115 may monitor whether an overcoat is put on/off. According to the exemplary embodiment of the present invention, the control unit 115 may include a separate sensor for monitoring whether the overcoat is put on/off. Otherwise, the overcoat itself may be an additional garment device. In this case, the control unit 115 of the garment device may recognize whether the overcoat is put on/off by communicating with the overcoat which is the additional garment device. The control unit 115 of the garment device recognizes whether the overcoat is put on/off, and then determines that a place is an indoor side. In this case, when the place is the indoor side, the control unit 115 may assume that the use of the smart watch is minimal and set the charging direction from the smart watch to the mobile phone.

Otherwise, the control unit 115 may recognize a worn garment, and reflect a context of the user according to the kind of worn garment.

For example, when it is sensed that the user wears a training garment in addition to the garment device, the control unit 115 may predict that the amount of physical action of the user. In this case, when the control unit 115 senses that the user wears the training garment, the control unit 115 regulates a time from the wearing of the training garment to a movement to an exercise place as a wireless charging period, and determine the charging direction so that power of the smart phone is transmitted to the wearable device during the corresponding period.

In addition, those skilled in the art may set the charging direction in accordance with the situation within the scope and without departing from the technical spirit of the present invention.

The garment device receives power from the first mobile device by using the first connection unit according to the determined charging direction (S460). Further, the garment device may receive power from the first mobile device only when the charging residue of the first mobile device is equal to or larger than a predetermined reference based on the information related to the battery of the first mobile device.

The garment device transmits the received power from the first connection unit to the second connection unit through the fabric cable according to the determined charging direction (S470). Furthermore, the power received from the first mobile device may be temporarily stored in the energy storing unit of the garment device and then transmitted to the second connection unit, or may be directly transmitted to the second connection unit through the fabric cable. In this case, some of the power temporarily stored in the energy storing unit may also be used for driving the garment device.

The garment device wirelessly charges the second mobile device with the power transmitted in the transmission operation S470 (S480). More particularly, the wireless charging operation S480 may be controlled by the control unit 115.

For example, the power supplied to the first connection unit is supplied as a current for magnetically inducing the second connection unit, so that the control unit 115 may induce a change in a magnetic field of the second connection unit and thus wirelessly charge the second mobile device. That is, the garment device may transmit the power between the first and second mobile devices from one side to the other side through an interface.

Furthermore, a wireless charging path and a wireless charging quantity for the first or second connection unit may also be provided through the visual, audible, or tactile providing means of the garment device or the first or second mobile device.

Furthermore, the garment device may control the wireless charging activation mode of the second mobile device based on user information related to wireless charging.

For example, the garment device may determine user information related to the wireless charging, (such as a physical state of the user, an action state of the user, a schedule of the user, a wireless charging time (day and night), and a place (an indoor place or an outdoor place), by utilizing the biosensor provided in the mobile device or the garment device or SNS information related to the user) and control the wireless charging activation mode by considering the determined user information. More particularly, when a stop state of the user (such as a state in which the user is sleeping or sits within a moving vehicle) is maintained for a predetermined time, the garment device may wirelessly charge the second mobile device rapidly, or recognize a schedule of the user in advance and wirelessly charge the second mobile device rapidly in a time zone, in which the wireless charging is available. It is a matter of course that the garment device may notify the user of the wireless charging in advance before the performance of the rapid wireless charging, or provide related guide information in advance.

By contrast, even in the wireless charging activation mode, when the user is moving or doing exercise, wireless charging efficiency is decreased, so that the garment device may restrict an unnecessary attempt to wirelessly charge the second mobile device, or when the user is in the outdoor place on a rainy day, the garment device may intentionally restrict an attempt to wirelessly charge the second mobile device by utilizing GPS information or weather information for the reason of safety.

Furthermore, the garment device may wirelessly charge the plurality of mobile devices satisfying the proximity condition with the garment device with the power supplied from the first mobile device. That is, this refers to the case where the number of second mobile devices, which are wireless charging targets is two or more.

For example, the power quantity to be obtained from the first mobile device may be determined in consideration of a required charging quantity based on the information related to the batteries of the two or more worn mobile devices. Further, the charging states, the information related to the batteries, or the guide information about the mobile devices, which are the wireless charging targets may be provided only to a specific mobile device (for example, the first mobile device).

Furthermore, when a wireless charging quantity of the second mobile device satisfies a predetermined level, the garment device may provide a guide for releasing the wireless charging activation mode through an execution screen of the wireless charging related application.

For example, when the charging of the second mobile device is not completed at 100% but is achieved at 70% set by the user, the garment device may induce the user to perform a wireless charging release operation by providing the user with a notification. For example, an operation of rolling up the sleeve or a change in a state of the covering sleeve.

According to another exemplary embodiment of the present invention, the garment device may sense body information by using the sensing unit, and transmit the sensed body information to at least one of the first and second mobile devices through the communication unit by using power received from at least one of the first and second mobile devices. Furthermore, the sensed body information may be obtained by the sensing unit of the garment device and transmitted to a specific area through the fabric cable, and transmitted to a corresponding mobile device through the communication unit provided in the specific area.

More particularly, when the garment device requires predetermined power for transmitting the body information sensed by the garment device itself to the mobile device, the garment device may transmit wireless charging request information to the mobile device through the communication unit. Accordingly, the mobile device may supply power to the connection unit of the garment device based on the wireless charging request information. By contrast, when the mobile device needs to collect a plurality of elements of body information according to an executed application (for example, healthcare), the mobile device may wirelessly supply predetermined power to the connection unit of the garment device, and then obtain the body information from the garment device.

According to another example embodiment of the present invention, when the garment device senses an event related to the performance of the wireless charging in a specific area among a plurality of areas, the garment device may wirelessly charge the mobile device corresponding to the specific area or stop the wireless charging of the mobile device corresponding to the specific area. More particularly, the maintenance or stop of the wireless charging may be controlled by the control unit of the garment device.

For example, when the garment device receives a user gesture for the garment device as the wireless charging event, the garment device may set the wireless charging activation mode for the mobile device generating the wireless charging trigger command among the plurality of worn mobile devices, and execute the wireless charging related application trough at least one of the plurality of mobile devices. A user gesture corresponding to the wireless charging performance event may include a gesture of covering the sleeve on a smart watch, a gesture of pulling a strap of a smart bag to increase intensity of a proximity state, a gesture of wearing smart glasses on a smart hat so that a contact area is generated between both devices, or the like.

Otherwise, the garment device may sense a predetermined gesture, such as a gesture of shaking an arm or a gesture of stamping the user's feet, or a gesture defined by the user as the charging performance event, and may perform the charging. The gesture of shaking the arm may be sensed by the smart watch, and the gesture of stamping the user's feet may be sensed by a smart shoe.

By contrast, when the garment device receives a gesture (for example, an action of rolling up or folding the sleeve) of releasing the proximity condition with the user's gesture for the garment device as the wireless charging stop event, the garment device may stop the wireless charging and stop the execution of the wireless charging related application. That is, the garment device may determine a case, in which garment device or the mobile device deviates from the threshold value satisfying the proximity condition is generated after a touch to the garment device of the user, as a user's active wireless charging stop event.

According to another example embodiment of the present invention, the garment device may determine whether to perform the wireless charging by utilizing user authentication information of the garment device or the mobile device under the control of the control unit.

For example, only when the user of the garment device is matched to the user of the mobile device, the garment device may set the wireless charging and the information transmission to be available. Further, the garment device may add the number of users of which authentication is available. The user authentication may include all of the fingerprint authentication and authentications utilizing biometric information.

Hereinafter, various exemplary embodiments of the wireless charging method using the garment device and the mobile device will be described.

Figure 5:
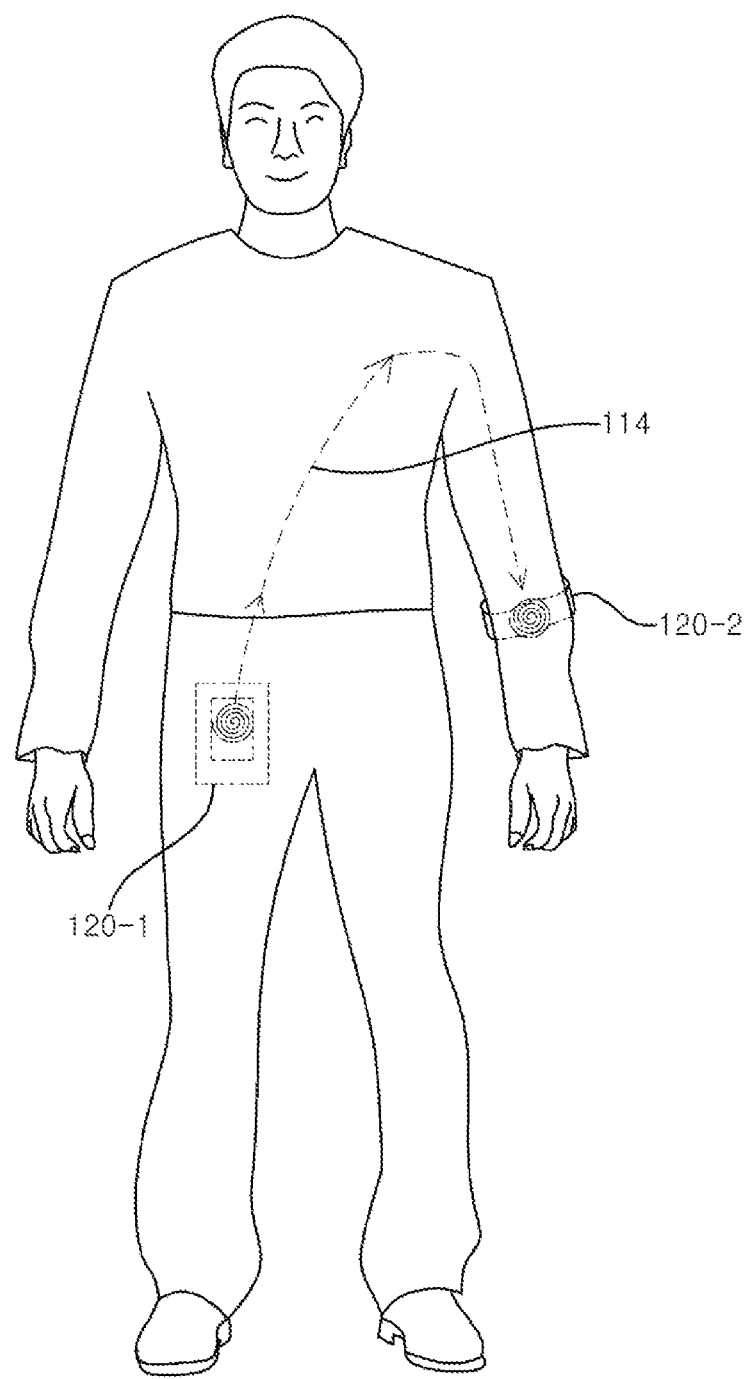
FIG. 5 illustrates wireless charging between the plurality of mobile devices through the garment device, according to the embodiments as disclosed herein.

FIG. 5 illustrates wireless charging between the plurality of mobile devices through the garment device, according to the embodiments as disclosed herein.

Referring to the FIG. 5, the first connection unit in the first area and the second connection unit in the second area are electromagnetically connected to each other through the fabric cable, so that the first and second mobile devices 120-1 and 120-2 may be present within one interface together with the garment device.

When the physically divided first and second mobile devices 120-1 and 120-2 satisfy the proximity conditions for the first and second areas, respectively, the first and second mobile devices 120-1 and 120-2 may execute the wireless charging related application, and display an execution screen through the display provided in at least one of the first and second mobile devices 120-1 and 120-2. Accordingly, the user may confirm charging information (for example, a charging residue, a use residual time corresponding to a currently executed application, or the like) about at least one of the first and second mobile devices 120-1 and 120-2 through the execution screen.

Furthermore, the first and second mobile devices 120-1 and 120-2 may exchange various information (for example, information related to the battery) by utilizing the fabric cable 114 or a wired or wireless communication means (not illustrated). The first and second mobile devices 120-1 and 120-2 may also generate a wireless charging trigger command based on the various exchanged information.

Furthermore, the first and second mobile devices 120-1 and 120-2 may perform the control related to a feedback through the audible and tactile means or wireless charging.

Figure 6:
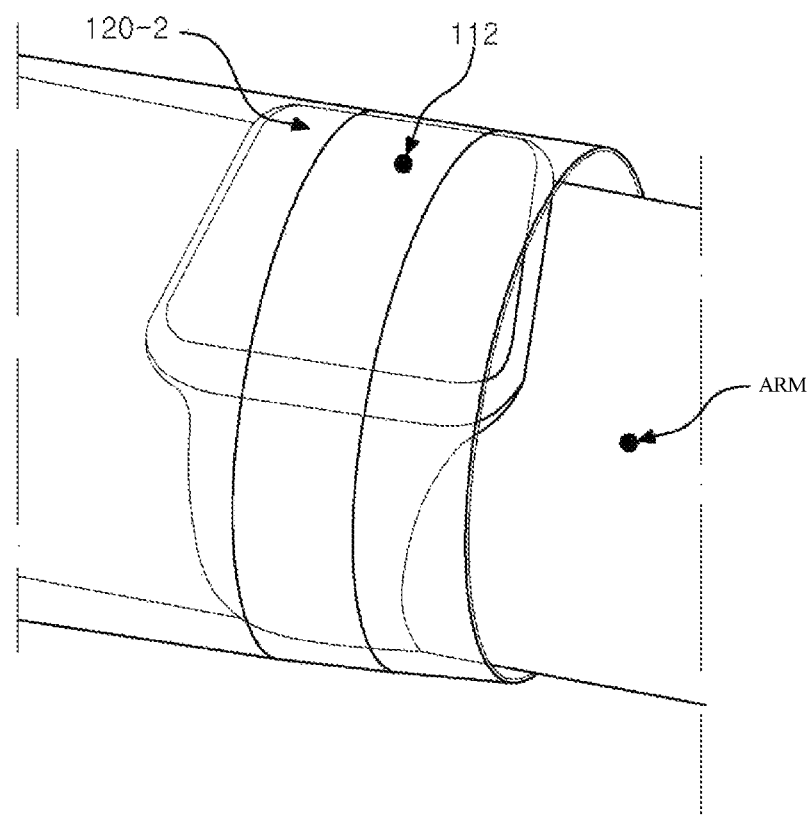
FIGS. 6 and 7 are diagrams illustrating proximity of the mobile device to a specific area of the garment device, according to the embodiments as disclosed herein.
Figure 7:
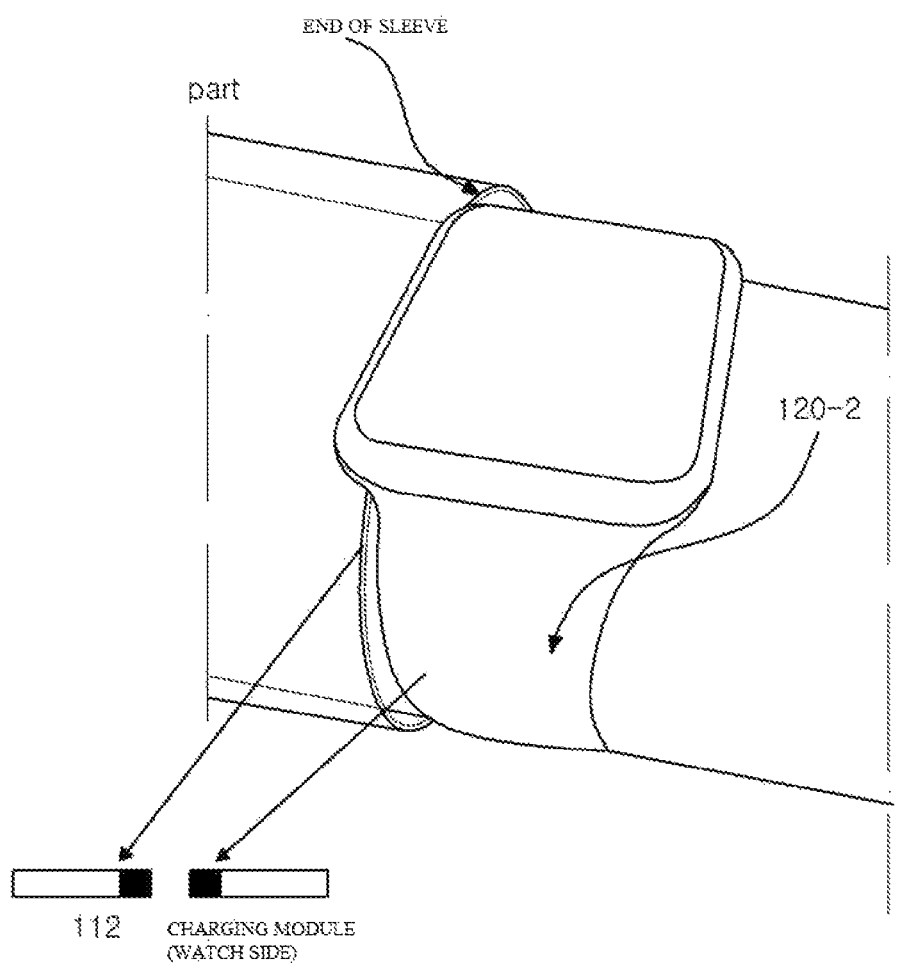

FIGS. 6 and 7 are diagrams illustrating proximity of the mobile device to a specific area of the garment device, according to the embodiments as disclosed herein. For convenience of description, it is assumed that the mobile device is a smart watch.

Referring to the FIG. 6, when the smart watch 120-2 is covered or caught by the sleeve, the garment device may sense that the connection unit (located at the sleeve) of the second area 112 is in a contact with or proximate to the smart watch (particularly, a wireless charging module) 120-2, and set a wireless charging standby mode for the smart watch 120-2.

When at least one of the garment device and the smart watch 120-2 is in a charging quantity state equal to or smaller than a threshold point in the wireless charging standby mode, the garment device may control the first connection unit or the wireless charging module of the smart watch and perform wireless charging by a magnetic induction method. The first connection unit or the wireless charging module of the smart watch 120-2 may serve as a primary coil or a secondary coil, and may bi-directionally and wirelessly charge power from the garment device to the smart watch or from the smart watch to the garment device.

Furthermore, the smart watch or the garment device may be provided with a physical means (for example, a ring, an adhesive member, a button, and a zipper) or an electromagnetic means so that the state of the smart watch covered by the sleeve is fixed.

Furthermore, information related to the battery of the smart watch may also be provided to a body region around the sleeve or the worn smart watch through a module (for example, a display, a projector, and an LED) of the smart watch.

Referring to the FIG. 7, in order to make the smart watch 120-2 be in contact with the area 112 of the sleeve 112 corresponding to the smart watch 120-2 so as to satisfy the proximity condition, a configuration having a magnetic property (for example, a magnet or a magnetic material) or an easily attachable material or an attachment means having a physical structure may be included in a predetermined area of the smart watch 120-2 and a predetermined area of the sleeve. For example, a magnet or a magnetic material may be formed in a body of the smart watch or the strap area of the smart watch, and the corresponding configuration may be included in a predetermined area (an end portion) of the sleeve of the garment device. In this case, the magnet may be included at a position, at which electromagnetic induction is not disturbed during the wireless charging.

Further, when the contact or proximity state of the sleeve and the smart watch is actively released, the wireless charging may be stopped. For example, when the user takes a gesture of folding or rolling up the sleeve, which covers the smart watch or crosses a neighboring area of the smart watch, the garment device or the smart watch may sense the gesture, and restrict a supply of a current to the coil based on the sensed proximity state release gesture to stop the wireless charging by the magnetic induction method.

Figure 8:
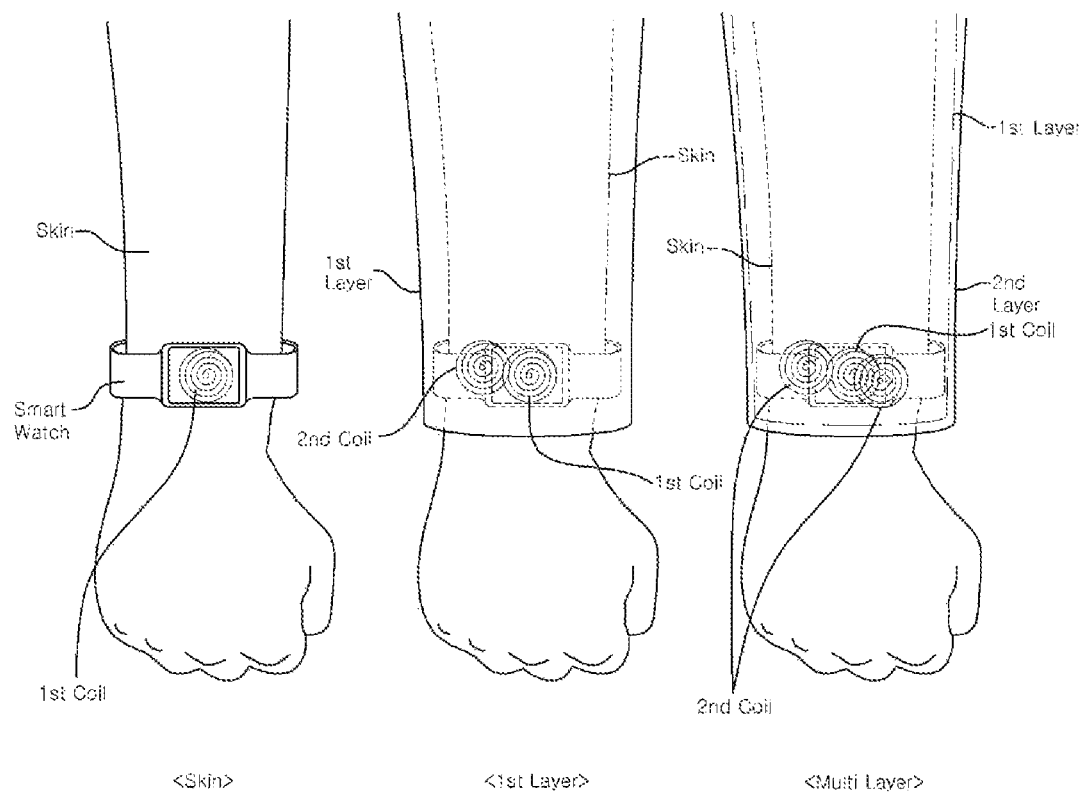
FIG. 8 is a diagram illustrating a rapid charging scenario according to coil overlapping when a user wears a plurality of garment devices, according to the embodiments as disclosed herein.

FIG. 8 is a diagram illustrating a rapid charging scenario according to coil overlapping when a user wears a plurality of garment devices, according to the embodiments as disclosed herein.

Referring to the FIG. 8, when the user wears the plurality of garment devices (for example, wears a shirt and a jacket), rapid wireless charging according to overlapping the connection units of the plurality of garment devices may be performed.

More particularly, when the mobile device senses the wearing of the plurality of garment devices, the mobile device may provide the user with a UI inquiring whether to perform rapid wireless charging through the overlapping connection units or the widely disposed connection units, and control the wireless charging module so that intensity or density of a magnetic flux is increased through the overlapping connection units (or the widely disposed connection units) during the performance of the rapid wireless charging and the rapid wireless charging is available.

As illustrated in the FIG. 8, when the user wears only the first garment device (first layer) in a state (skin) of wearing the smart watch, the wireless charging module (first coil) of the smart watch is proximate to the connection unit (second coil) of the first garment device, so that the wireless charging may be performed.

In addition, when the user overlaps and wears the second garment device (multi-layer), the first connection unit of the first garment device and the connection unit (second coil) of the second garment device may overlap or be widely disposed. That is, the garment device has the multi-coil form, so that it is possible to improve charging efficiency and enter a rapid charging mode by increasing intensity of a magnetic flux or uniformity of a magnetic flux.

Further, the garment device or the mobile device may feed-back or guide rapid charging available information to the user, and when the garment device or the mobile device receives a gesture of tapping the sleeve on the smart watch or folding two or more sleeves side by side and covering the smart watch from the user, the garment device or the mobile device may perform the rapid charging.

Furthermore, a position of the coil may be determined (when the user wears the plurality of garment devices) so that the multi-coil is formed by overlapping sleeves, and the plurality of coils may be disposed at a predetermined interval in a predetermined area of the sleeve so that the multi-coil is formed when the user wears the single garment device.

Figure 9:
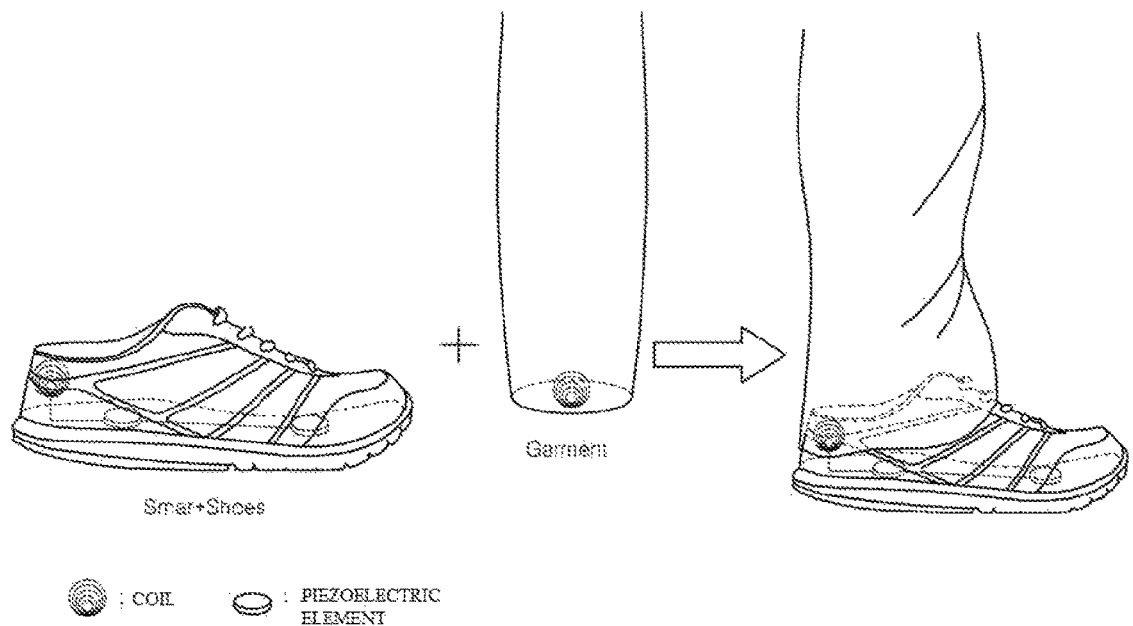
FIG. 9 is a diagram illustrating a wireless charging scenario in which the mobile device is a smart shoe and the garment device is a lower garment, according to the embodiments as disclosed herein.

FIG. 9 is a diagram illustrating a wireless charging scenario in which the mobile device is a smart shoe and the garment device is a lower garment, according to the embodiments as disclosed herein.

Referring to the FIG. 9, piezoelectric energy generated by the smart shoe may be wirelessly supplied to another mobile device through the connection unit of the garment device. The smart shoe may store the generated piezoelectric energy, and may transmit the stored piezoelectric energy to the connection unit of the garment device through the wireless charging module. Accordingly, the garment device may wirelessly charge another mobile device worn to be proximate to the second connection unit with power corresponding to the transmitted piezoelectric energy.

More particularly, the garment device may transmit power, which is generated by using a piezoelectric effect to a specific position of the smart shoe and store the power. The garment device may allow the stored power to flow to a coil provided at the specific position of the smart shoe and transmit the power to a coil of the garment device at a proximate position during the wireless charging. For example, when the specific position of the smart shoe is in contact with or proximate to a predetermined area of a lower end of the trouser within a predetermined distance, the garment device enters the wireless charging standby mode and exchanges battery related information. When the device having a charging quantity equal to or smaller than a threshold point is sensed, the garment device may switch a mode of the sensed device to the wireless charging activation mode and perform the wireless charging.

Furthermore, the garment device may determine a location or an environment of a wearer by utilizing a GPS sensor, a humidity sensor, or the like provided in the smart shoe, and determine whether the wireless charging is available according to the determination. For example, when the user is present in an outdoor side on a rainy day, the garment device may set the wireless charging to be stopped or not to be performed.

Furthermore, in order to perform the wireless charging while minimizing electrical loss, a coil formed position of the smart shoe may be designed to be closely located to a coil formed position of the lower garment by combining an adhesive structure or a magnet structure at the coil formed position of the smart shoe.

Although not illustrated in the drawing, another mobile device may be wirelessly charged through the garment device by utilizing kinetic energy generated by the smart watch or solar energy generated by the smart bag (or the smart hat).

Figure 10:
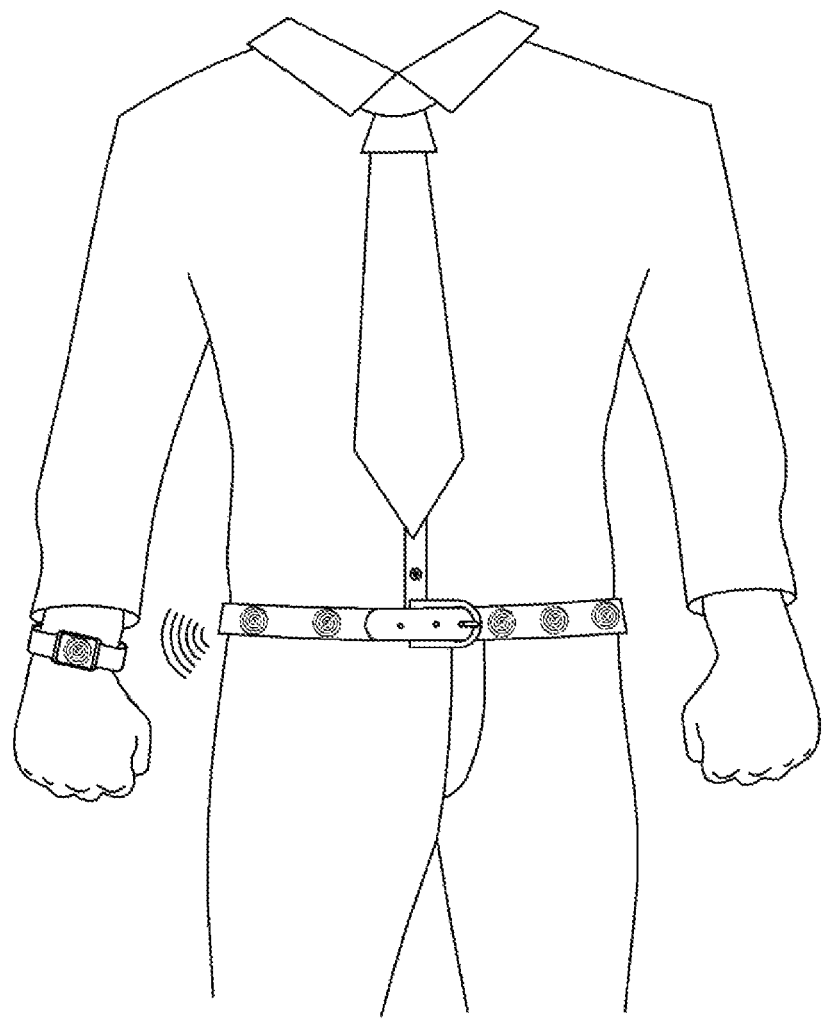
FIG. 10 is a diagram illustrating a wireless charging scenario in which the mobile device is a smart watch and the garment device is a belt, according to the embodiments as disclosed herein.

FIG. 10 is a diagram illustrating a wireless charging scenario in which the mobile device is a smart watch and the garment device is a belt, according to the embodiments as disclosed herein.

Referring to the FIG. 10, the belt may be proximate to or be in contact with the smart watch according to a posture (for example, sitting on a chair, standing motionless, and lying side by side) of the user. In this case, according to the contact or the proximity of a connection unit (for example, a fabric coil unit) within the belt and a wireless charging module (for example, a fabric coil unit) within the smart watch, both devices may enter the wireless charging standby mode, and exchange battery related information (for example, charging information). Further, when there is the device having a charging quantity equal to or smaller than a threshold point, the corresponding device may enter the wireless charging activation mode and perform wireless charging.

Further, the connection units within the belt are designed to be disposed at both edges when the user wears the belt so that the belt may be easily proximate to or in contact with the smart watch. Otherwise, when a part, in which a battery of the smart watch is embedded, has a detachable structure, the smart watch may perform the wireless charging by the magnetic induction method with the connection unit within the belt by separating only the corresponding part and making the separated corresponding part be proximate to the connection unit of the belt. In this case, the part embedding the battery of the smart watch may be provided in a body of the watch or be provided in a band of the watch in a form of a cable battery.

Furthermore, when it is determined that the proximate state of the belt and the smart watch is stable (for example, a wearer falls asleep wears the belt while wearing the belt or sits in a moving vehicle, which is recognized based on body information of the smart watch), the garment device may control the rapid wireless charging to be intensively performed.

Figure 11:
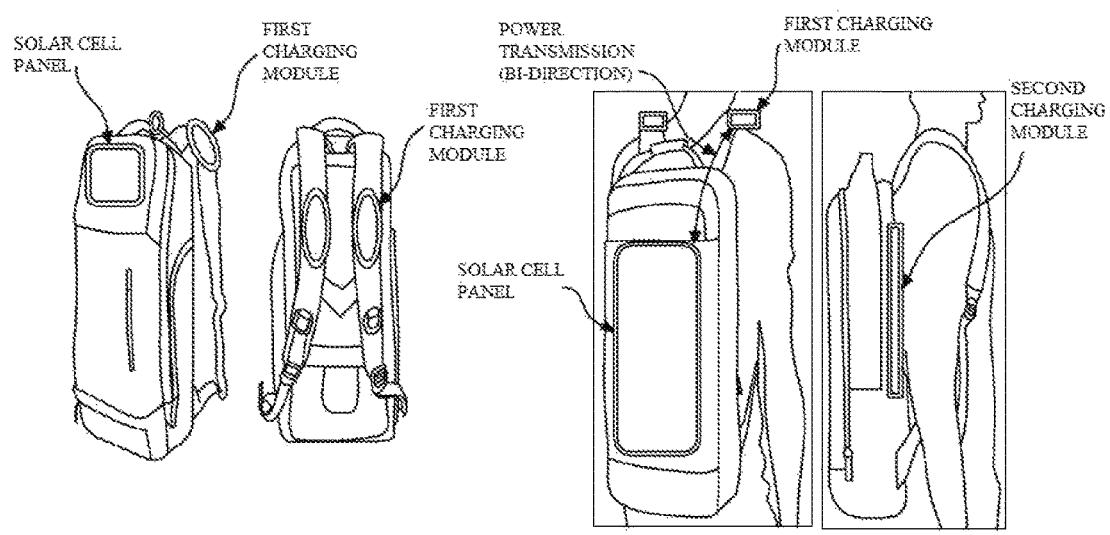
FIG. 11 is a diagram illustrating a wireless charging scenario in which the mobile device is a smart bag and the garment device is an upper garment, according to the embodiments as disclosed herein.

FIG. 11 is a diagram illustrating a wireless charging scenario in which the mobile device is a smart bag and the garment device is an upper garment, according to the embodiments as disclosed herein.

Referring to the FIG. 11, considering a case where the user wears the smart bag during the wearing of the garment device, a wireless charging module of the smart bag may be located at a position, at which the wireless charging module of the smart bag may be in contact with or proximate to the connection unit of the garment device within a predetermined distance. For example, the wireless charging module may be located at a part of a strap of the bag hung over the shoulder of the user.

Further, in order to sense that the user puts on the smart bag during the wearing of the garment device, a pressure sensor may be provided in a predetermined area of the strap of the smart bag, and be set to recognize wearing states of the two devices when a predetermined pressure or larger is sensed. Further, an electric circuit itself may be implemented of fabric by applying a fabric battery technology to the strap of the smart bag, so that the garment device may store power generated by a solar cell mounted on an external surface of the smart bag and transmit the power to another position or another device.

Furthermore, the wireless charging module may be provided at a portion of the smart bag, which is in contact with a back portion of the garment device during the wearing of the smart bag. When the connection unit located at the back portion of the garment device and the wireless charging module satisfy the proximity condition, the garment device may wirelessly charge an electronic product, such as a notebook computer and a pad, incorporated in the smart bag, or transmit the power of the electronic products to the garment device.

FIG. 12 is a diagram illustrating a mobile payment scenario using the garment device and the mobile device, according to the embodiments as disclosed herein. In this case, a security element may be stored in the smart phone 120-1 or the smart watch 120-2, which is the mobile device.

Figure 12A:
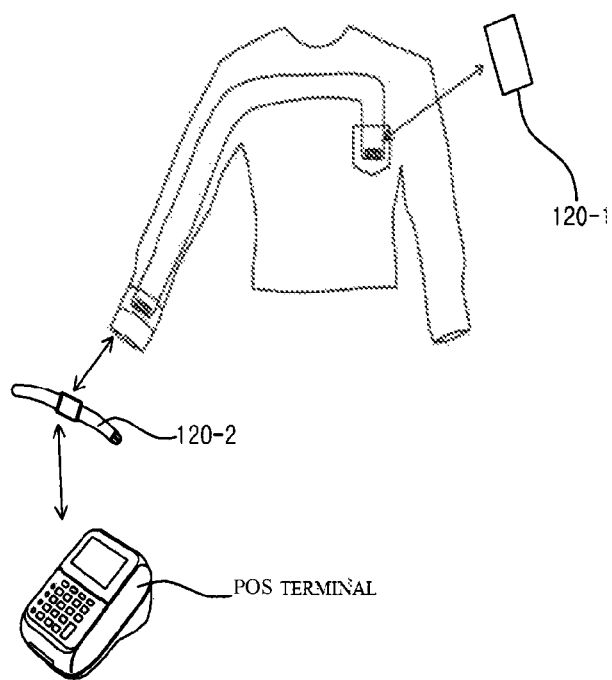
FIG. 12A and FIG. 12B are diagrams illustrating a mobile payment scenario using the garment device and the mobile device, according to the embodiments as disclosed herein.

In an embodiment, referring to the FIG. 12A, the security element of the smart phone 120-1 may be transmitted to the smart watch 120-2 through the garment device, so that a mobile payment utilizing near field wireless communication (for example, NFC) may be available without needing to take the smart phone 120-1 out of the pocket or separately transmit information of the smart phone 120-1 to the smart watch.

Figure 12B:
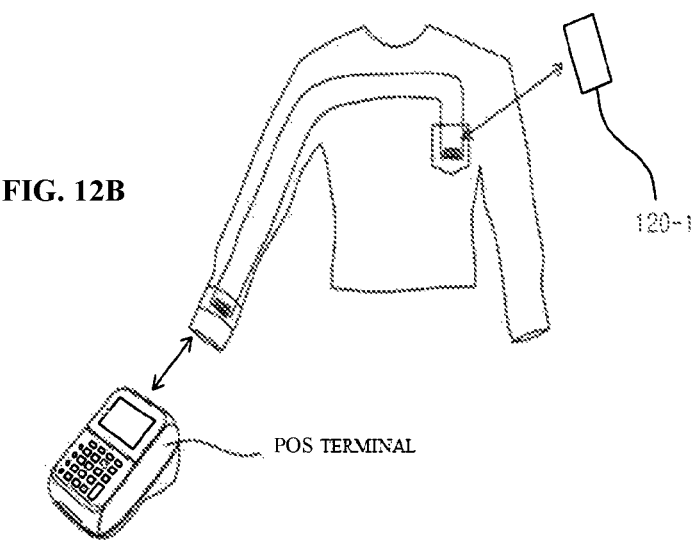

Referring to the FIG. 12B, the smart phone 120-1 may communicate with a mobile payment terminal through a connection line and the connection unit of the garment device, so that a mobile payment may be available without needing to additionally take the smart phone 120-1 out of the pocket.

Figure 13:
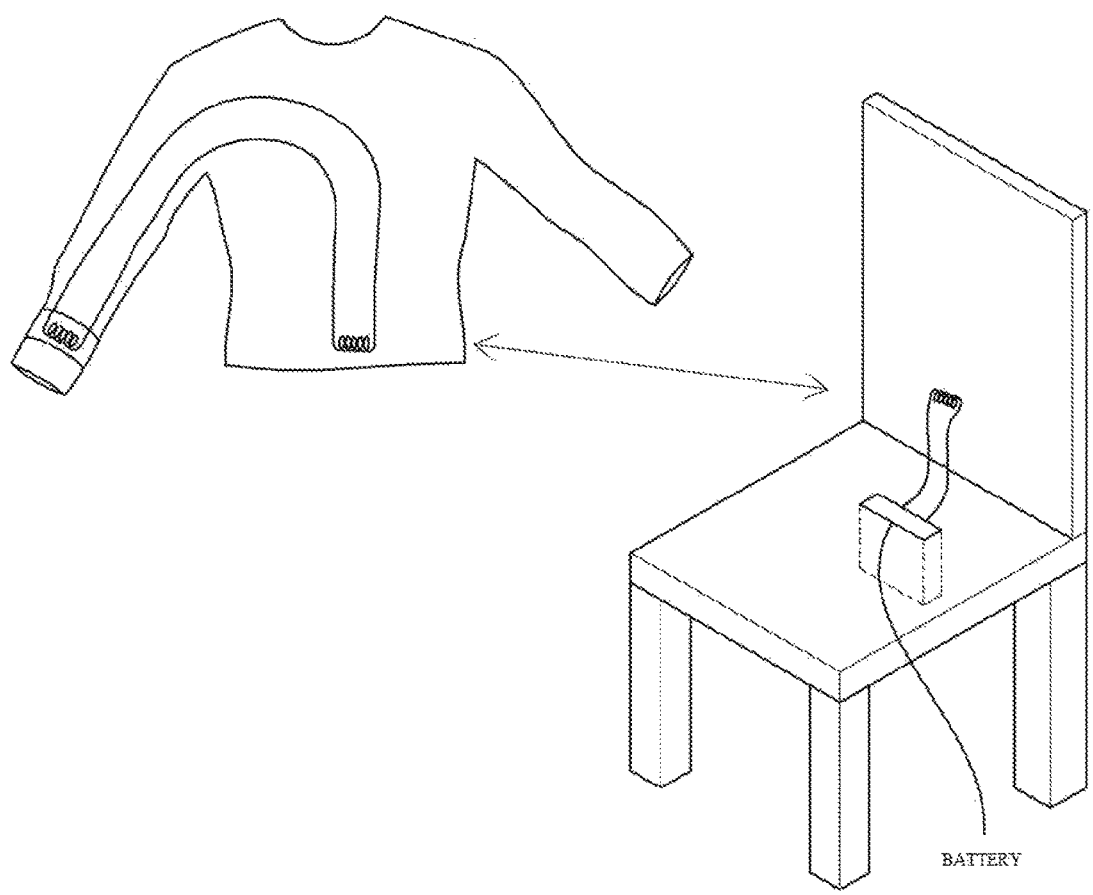
FIG. 13 is a diagram illustrating a wireless charging scenario of a mobile device by using a smart chair and the garment device, according to the embodiments as disclosed herein.

FIG. 13 is a diagram illustrating a wireless charging scenario of a mobile device by using a smart chair and the garment device, according to the embodiments as disclosed herein. For convenience of description, as illustrated in the FIG. 1, it is assumed that a user wears the first and second mobile devices.

Referring to the FIG. 13, when the user sits on the smart chair, a connection unit provided at a waist portion of the worn garment device is proximate to a connection unit of the smart chair, so that the first mobile device incorporated in a pocket or the second mobile device worn to be proximate to a sleeve may be charged with power provided from the smart chair.

Figure 14:
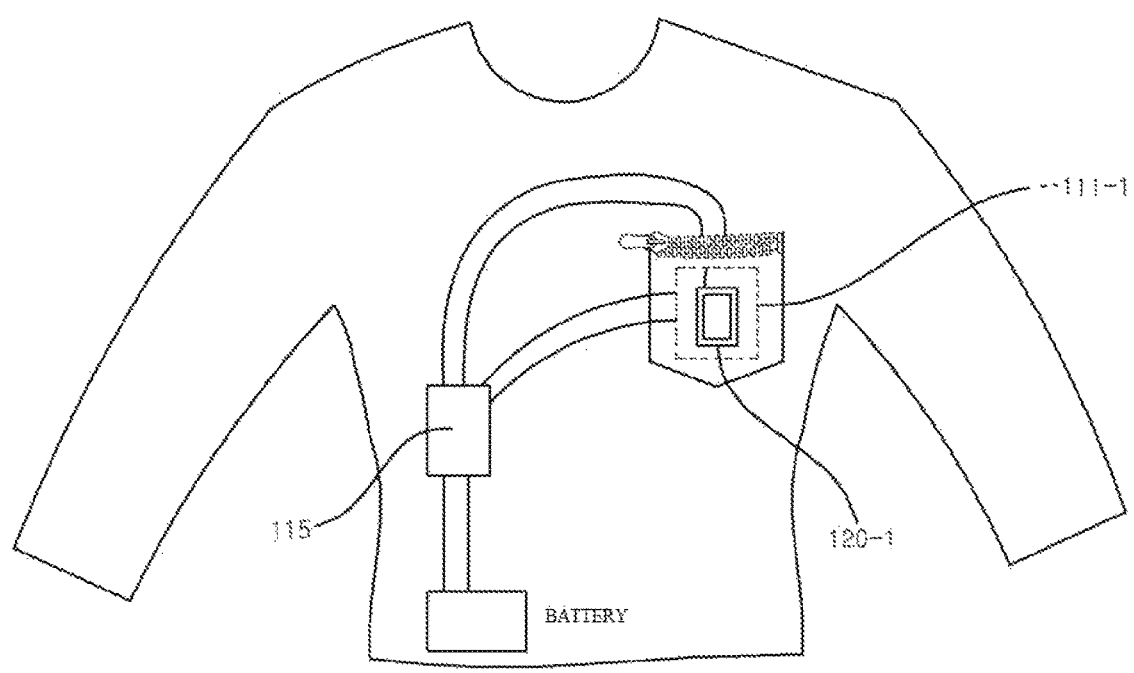
FIG. 14 is a diagram illustrating a wireless charging alarm scenario through the garment device, according to the embodiments as disclosed herein.

FIG. 14 is a diagram illustrating a wireless charging alarm scenario through the garment device, according to the embodiments as disclosed herein.

Referring to the FIG. 14, the control unit 115 of the garment device controls the garment device to start charging or discharging when a zipper or a button mounted in the pocket is closed, and stop charging or discharging when the zipper or the button mounted in the pocket is opened. In this case, an LED lamp may be formed at a part of the zipper, so that the control unit 115 may notify that the garment device is being performing charging or discharging by turning on the LED lamp or changing a color of the LED lamp during the charging or discharging. Furthermore, the garment device may include a battery in a super capacitor type therein.

According to another example embodiment of the present invention, in the mobile device according to the present invention, the wireless charging module may be provided at a body or a detachable specific part of the mobile device. Particularly, when the wireless charging module is provided at the specific part, the specific part, in which the wireless charging module is embedded, may be separated and attached to the connection unit of the garment device, and then the mobile device may be wirelessly charged in a state of maintaining the proximity condition.

The above example embodiments have been described based on the wireless charging, but wired charging may also be available according to the configuration of the device.

According to another example embodiment of the present invention, any one of a plurality of mobile devices connected to the garment device may serve as a control device according to the present invention. In the above description, the case where the garment device (including the control unit) is operated as the control device has been described, but this does not exclude the operation of the mobile device 120 as a control device.

For example, the mobile device designated as the control device may check the types of mobile devices connected to the garment device, charging/discharging possibility, a charging/discharging state, an identifier, and the like, as the control operation.

Otherwise, the mobile device designated as the control device may designate attributes (transmitters/receivers) of the connected mobile devices according to the charging/discharging state, as the control operation. More particularly, according to the charging/discharging state, the device designated as a transmitter may increase a charging/discharging voltage/current to be larger than an existing charging/discharging voltage/current so as to conform to the Qi standard in the device designated as the receiver. In this case, the device designated as the transmitter may increase the charging/discharging voltage/current by a predetermined quantity, or adjust and increase the charging/discharging voltage/current by a quantity requested by the device designated as the receiver. In the meantime, when the device is a battery, the device may also be designated only as a transmitter.

Hereinafter, various forms of connection methods between the mobile device 120 and the fabric device 110 will be described with reference to the FIGS. 15A to 20.

Figure 15A:
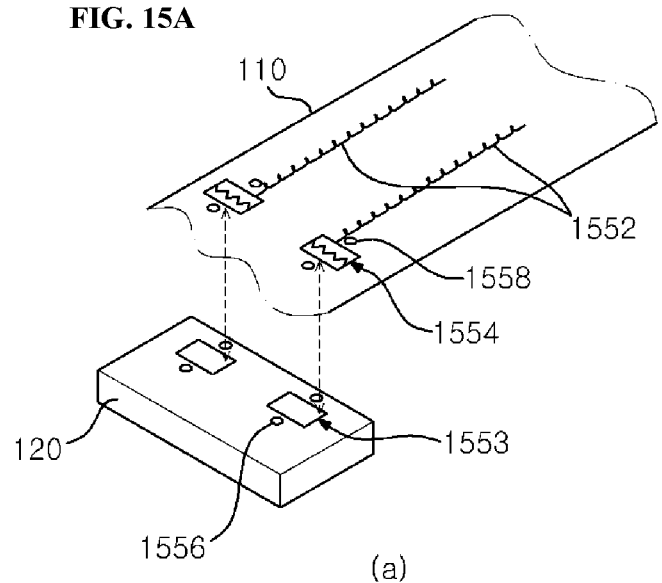
FIGS. 15A and 15B are diagrams illustrating a connection of a connection terminal within a sleeve of the garment device with a connection terminal of the mobile device, according to the embodiments as disclosed herein.

The FIG. 15A illustrates a connection between a connection terminal 1554 located within a sleeve of the garment device 110 and a connection terminal 1553 of the mobile device 120 in an exemplary embodiment of the present invention.

Referring to the FIG. 15A, in the present exemplary embodiment, the connection terminal 1553 of the mobile device 120 is located to be coupled with the connection terminal 1554 of the garment device 110 at a location, at which the connection terminal 1553 of the mobile device 120 overlaps the connection terminal 1554 of the garment device 110. In the present example embodiment, when the sleeve covers the smart watch, the smart watch is connected through the connection terminal 1554 of the first area provided in the garment device 110. In this case, in order to easily connect or maintain a connection between the connection terminal 1554 of the sleeve of the garment device 110 and the mobile device 120. For example, the connection terminal 1553 of the smart watch, the mobile device 120 may include an adhesion part 1556 formed of a magnet or an adhesive material. The adhesion part 1556 may provide a physical guide so that the garment device 110 and the mobile device 120 are located at a position, at which the garment device 110 and the mobile device 120 may be connected.

In the meantime, an adhesion part 1558 may be provided at the sleeve of the garment device 110 at a position corresponding to the adhesion part 1556 of the mobile device 120.

Figure 15B:
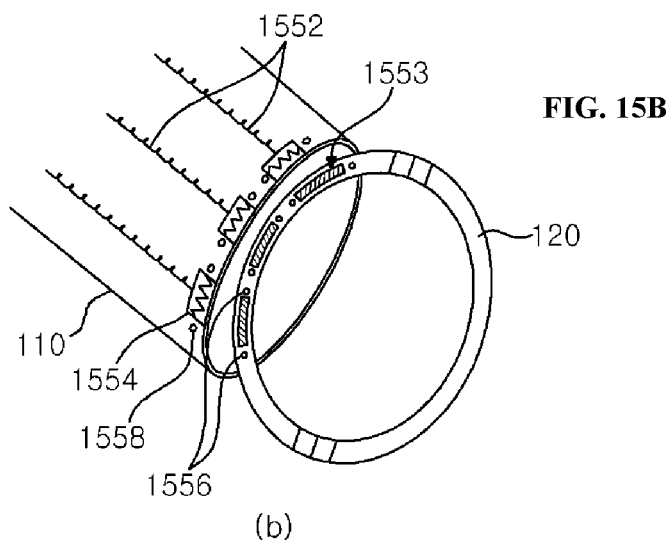

A structure of the FIG. 15B is basically the same as that of the FIG. 15A. However, in the present exemplary embodiment, connection terminals 1553 and 1554 and adhesion parts 1556 and 1558 are configured so that the mobile device 120 is coupled to an end of the sleeve of the garment device 110. Descriptions of the overlapping parts are omitted.

Figure 16:
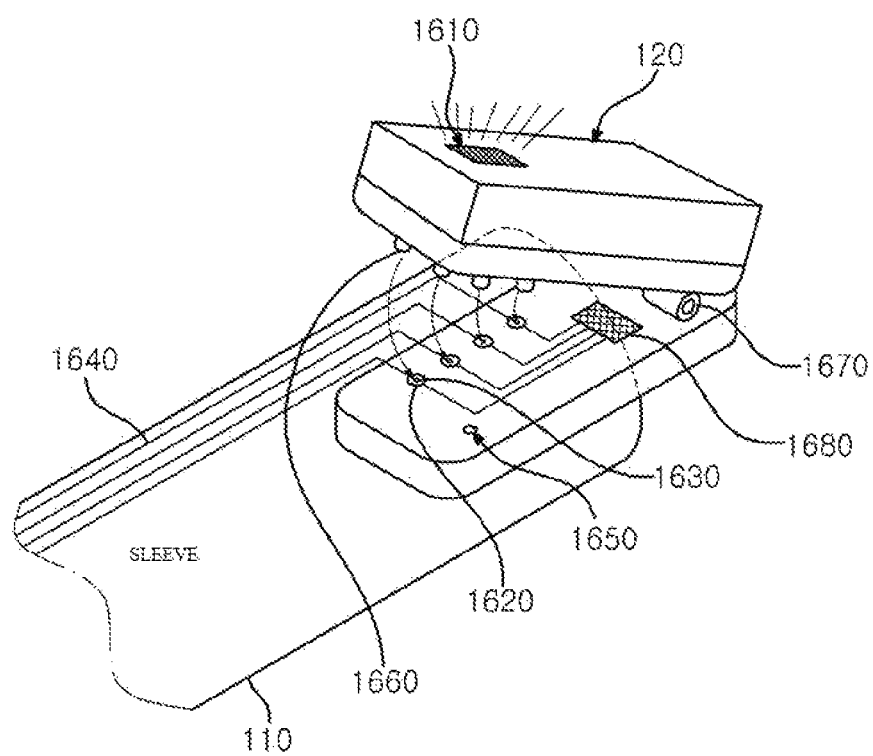
FIG. 16 is a diagram illustrating a configuration, in which the mobile device detachable in a clip form is coupled with the garment device, according to the embodiments as disclosed herein.

FIG. 16 is a diagram illustrating a configuration, in which the mobile device 120 detachable in a clip form is coupled with the garment device 110, according to the embodiments as disclosed herein.

The mobile device 120 is, for example, a main body of a smart watch, and does not have a strap or is separable from the strap. The mobile device 120 in the clip form may be a smart watch in a clip form, and may also be one, in which a main body of a smart watch is combined with a case in a clip form. The mobile device 120 in the clip form includes connection terminals 1620 and 1660 so as to be connected with the garment device 110.

When the mobile device 120 is in contact with/proximate to the sleeve of the garment device 110, a contact/proximity sensor 1650 may display whether the mobile device 120 is in contact with/proximate to and is connected with the garment device 110 through an output means, such as a display 1610 or a speaker (not illustrated). The connection terminal 1660 may be, for example, one electrode of a USB connection terminal supported by the mobile device 120. When the clip of the mobile device 120 is closed, the connection terminal 1660 of the mobile device 120 is connected with the connection terminal 1630 of the garment device 110 and the connection terminal 1620 at a lower side of the clip. The main body of the smart watch in the clip form assigns intensive elasticity to a hinge part 1670, and thus the main body of the smart watch may maintain strong connection with the connection terminal of the garment device in an engagement state.

In this case, a control unit 1680 of the mobile device 120 may be configured to perform the control of the garment device 110.

Figure 17:
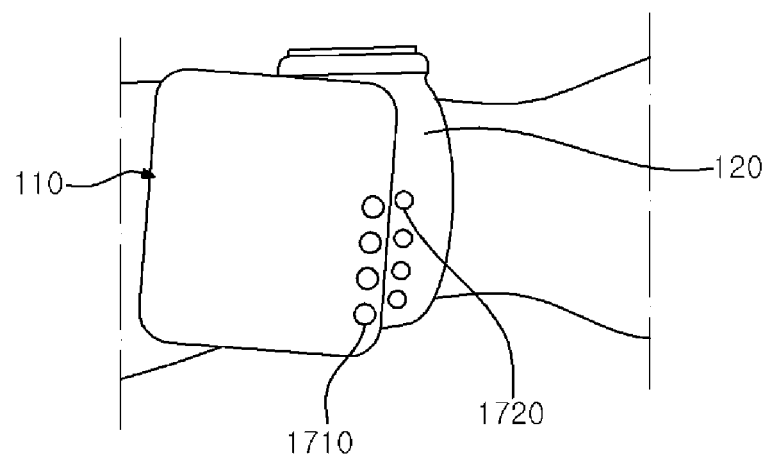
FIG. 17 is a diagram illustrating a connection terminal of the garment device and a strap connection terminal of the mobile device, which are implemented in forms of a protrusion and a fitting hole, respectively, according to the embodiments as disclosed herein.

FIG. 17 is a diagram illustrating a connection terminal 1710 of the garment device 110 and a connection terminal 1720 of a watch strap of the mobile device 120, which are implemented in forms of a protrusion and a fitting hole, respectively, according to the embodiments as disclosed herein.

The strap of the mobile device 120 includes the connection terminal 1720 in a form of a fitting hole, and the garment device 110 includes the connection terminal 1710 in a form of a protrusion. The connection terminal 1710 in the form of the protrusion is coupled with the connection terminal 1720 in the form of the fitting hole while being inserted into the connection terminal 1720, so that the mobile device 120 and the sleeve of the garment device 110 are fixed while being connected with each other. In this case, the number of connection terminals 1720 of the mobile device may be changed according to a connection standard. For example, in a form conforming to the USB standard, the mobile device 120 may have the four fitting holes 1720.

Otherwise, a different command signal may be generated according to the number of fittings and a fitted position of the connection terminal 1710 in the form of the protrusion and the connection terminal 1720 in the form of the fitting hole. For example, when the strap includes the four connection terminals 1720 in the form of the fitting hole and the garment device 110 includes the two connection terminals 1710 in the form of the protrusion, the mobile device 120 may recognize a case where the protrusions 1710 are fitted to the number 1 and 2 fitting holes and a case where the protrusions 1710 are fitted to the number 3 and 4 fitting holes as different connection modes. According to a connection mode, the mobile device may perform various controls, such as a display of different screens or performance of different applications.

Figure 18:
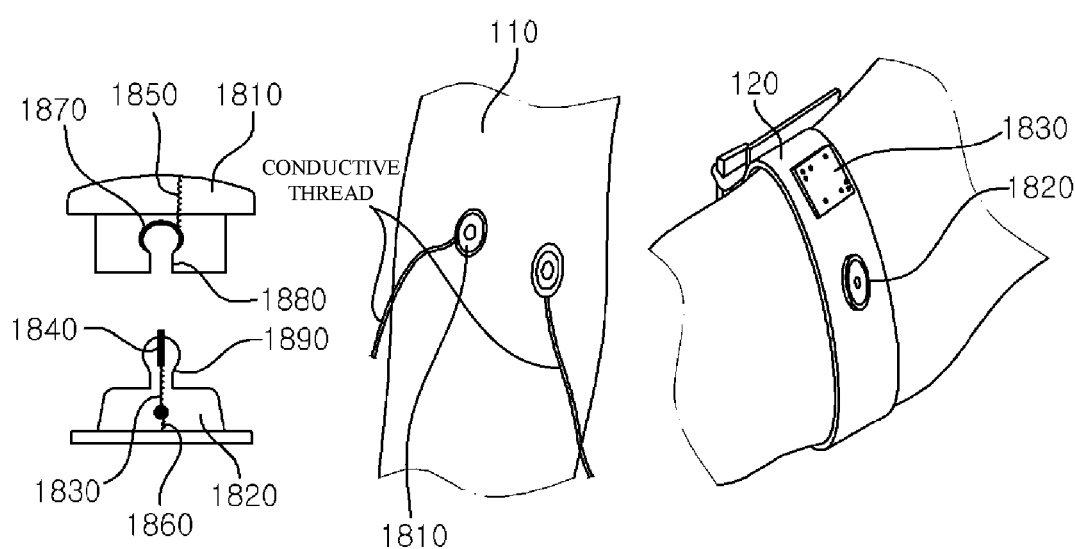
FIG. 18 is a diagram illustrating a connector provided with a connection terminal, which is in a form of a snap button and has improved coupling force by an elastic member, according to the embodiments as disclosed herein.

FIG. 18 is a diagram illustrating connectors 1810 and 1820 provided with connection terminals 1860 and 1870, which are in a form of a snap button and have improved coupling force by an elastic member 1830, according to the embodiments as disclosed herein.

The connector 1810 in a form of a female snap button includes a fitting part 1880 and a connection line 1850, and the fitting part 1880 includes the connection terminal 1870. The connector 1820 in a form of a male snap button includes a protrusion 1890 and a connection line 1860, and the protrusion 1890 includes the connection terminal 1840 and the elastic member 1830. When the two connectors 1810 and 1820 are coupled, the elastic member 1830 enables the two connection terminals 1870 and 1840 to maintain an electrical connection state through physical pressure.

In the present example embodiment, the garment device 110 includes the connector 1810, and a strap part of the mobile device 120 includes the connector 1820. The strap of the mobile device 120 may further include a separate sensor 1830. The sensor 1830 may include, for example, a heart rate sensor (or a part of the sensor) or a proximity sensor.

Figure 19:
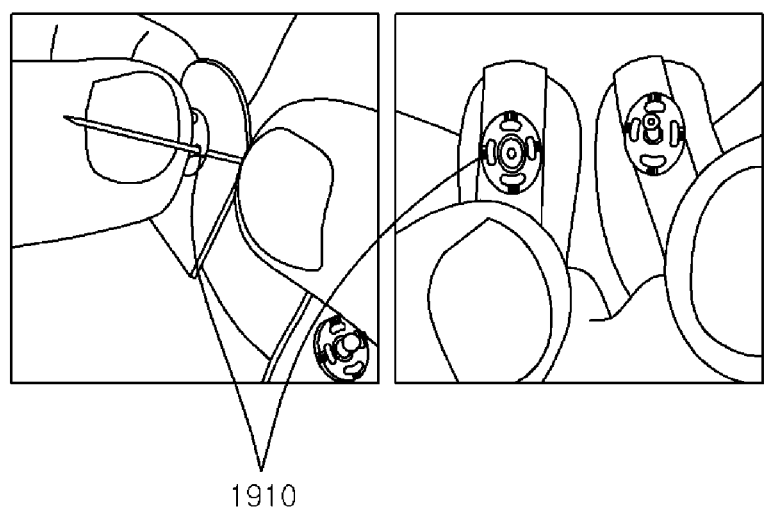
FIG. 19 is a diagram illustrating a connection of the connector of the FIG. 18 to the garment device trough a conductive thread, according to the embodiments as disclosed herein.

FIG. 19 is a diagram illustrating a connection of the connector 1810 of the FIG. 18 to the garment device through a conductive thread, according to the embodiments as disclosed herein.

A hole of a button is connected with the connection line 1850 of the FIG. 18 and a conductive thread 1910. For example, a thread weaved while a non-conductive thread crosses the conductive thread 1910 may be used. Through the connection, the garment device 110 may be electrically connected with the connector 1810. In the present example embodiment, it is illustrated that the garment device 110 is connected with the connector 1810 in the form of the snap button, but a contact region/state coupled when the button is fastened may be changed according to a position of the button, the kind of button, and the configuration of the conductive thread. Even within the same garment device, it is possible to discriminate a function by an operation of fastening each button.

For example, various command signals, such as a command to determine a target to be connected among the external devices, which are in contact with/proximate to the garment device, according to a fastened button, may be provided. For example, when a sleeve of the garment device 110 includes the button, the connected mobile device 120 may be recognized as a smart watch, and when a pocket includes the button and the button is connected, the connected mobile device 120 may be recognized as a smart phone or a battery. Otherwise, when the mobile device is connected with the button at a lower side of the back of the garment device 110, the garment device 110 may be recognized as being connected with a charging device.

Figure 20:
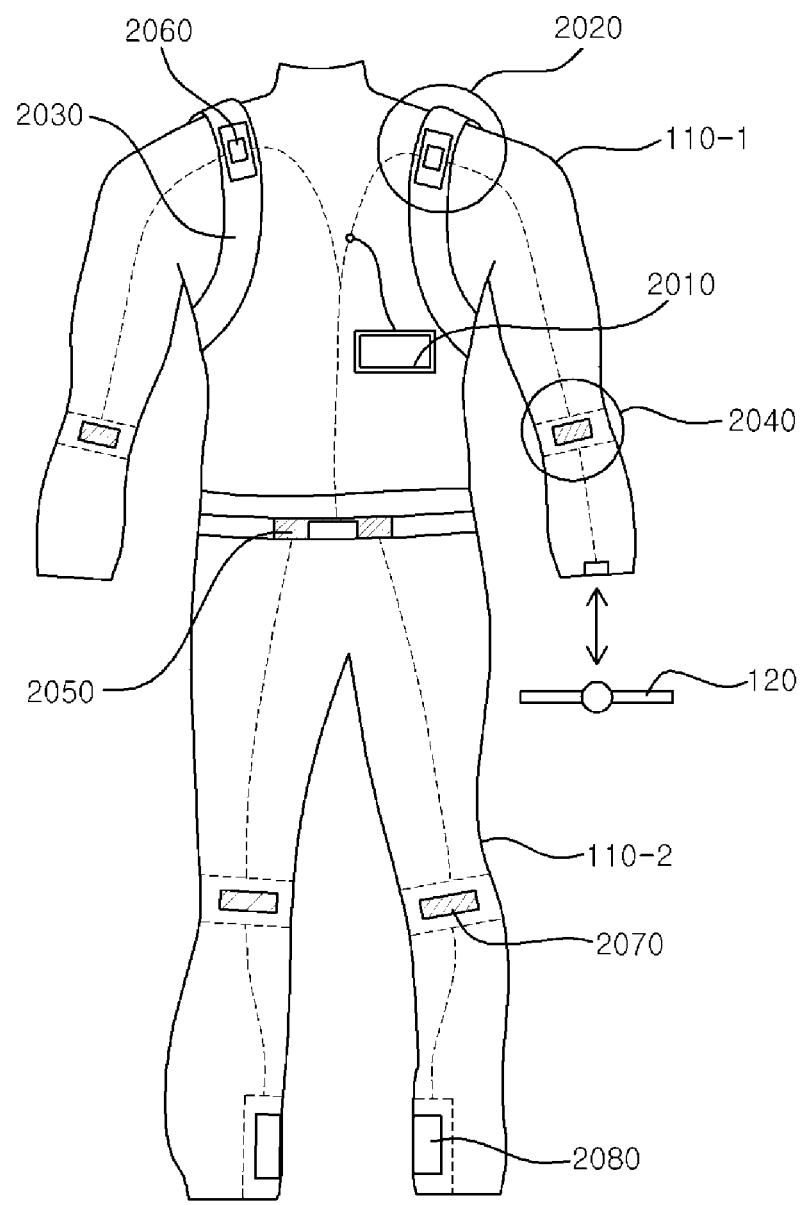
FIG. 20 is a diagram illustrating a connection of an upper garment and a lower garment among the garment devices through a connection terminal of a belt, according to the embodiments as disclosed herein.

FIG. 20 is a diagram illustrating a connection of the upper garment 110-1 and the lower garment 110-2 among the garment devices 110 through a connection terminal 2050 of a belt, according to the embodiments as disclosed herein.

Further, the garment device is connected with a bag 2030 through a connection terminal 2020. The connection terminal 2020 may include all of the wired/wireless connection terminals. The bag 2030 may include a battery (not illustrated), and may supply power to the upper garment 110-1, the lower garment 110-2, and the mobile device 120 through the connection terminal 2020. Further, whether the bag is proximate to/in contact with the upper garment 110-1 may be confirmed through a proximity/contact sensor 2060, which is capable of sensing proximity/contact. Further, the garment may also form a sensor network with several sensors, such as an electrocardiogram sensor 2010, a fabric sensing board 2040 detecting a bending of an arm, and a fabric sensing board 2070 detecting a bending of a knee.

The belt part 2050 may connect the upper garment 110-1 and the lower garment 110-2 so as to notify the mobile device 120 of a signal generated by the knee bending detecting sensor 2070 of the lower garment 110-2 or a connection of a connection terminal 2080 serving to connect the shoe. In this case, a natural contact/connection with the mobile device 120 may be induced only with the wearing of the upper garment 110-1 and the lower garment 110-2.

Referring to the FIG. 20, the garment device 110 may include the fabric sensing boards 2040 and 2070 disposed at joints of the body so as to effectively sense a movement of the body. Such a fabric sensing board A may sense a current change based on a change in a resistance value generated when the user moves their body or touches clothes. The fabric sensing boards 2040 and 2070 may use a principle in which resistance is changed while the fabric sensing boards 2040 and 2070 are stretched together with a part of the garment by, for example, the bending of the arm and the knee.

Accordingly, the labels are names of various devices or constituent elements are discriminatingly used as "a first . . . ", a second . . . ", or the like, and it is apparent that the devices or a constituent element are limited to by the terms. The terms are simply used for discriminating one device or constituent element from another device or constituent element. Accordingly, a first device or constituent element mentioned below may be a second device or constituent element within the technical spirit of the present invention.

The present invention is not limited to the above specific preferred example embodiments, the example embodiments may be variously modified by those skilled in the art to which the present invention pertains without departing from the subject matters of the present invention claimed in the claims, and the modifications belong to the scope disclosed in the claims.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the technical spirit and scope of the embodiments as described herein.

What is claimed is:

1. A system comprising:
   a garment device; and
   a control unit included within a first mobile device,
   wherein the garment device includes a first connection unit formed in a first area corresponding to a position on which the first mobile device is placed, a second connection unit formed at a position on which a second mobile device is placed, and a fabric cable electrically connected with the first connection unit and the second connection unit,
   wherein the control unit is configured to control one of a charging of the second mobile device from the first mobile device, and a charging of the first mobile device from the second mobile device based on a charging direction through the fabric cable, wherein the charging direction is determined based on a battery information of one of the first mobile device and the second mobile device, and wherein the second connection unit includes a coil, and the control unit controls the first mobile unit to increase charging voltage so as to confirm a wireless charging standard between the second mobile unit and the second connection unit when the second mobile unit is charged from the first mobile unit.

2. The system of claim 1, wherein when at least one of the first mobile and the second mobile device satisfies a proximity condition for a corresponding area between the first area and the second area, the control unit is configured to control at least one of the first mobile device and the second mobile device to execute a charging related application.

3. The system of claim 1, wherein when the first mobile device and the second mobile device satisfy a proximity condition for the first area and the second area, the garment device sets a charging standby mode for the first mobile device and second mobile device.

4. The system of claim 1, wherein the first area is corresponding to the position on which the first mobile device is worn.

5. The system of claim 1, wherein the second area is corresponding to the position on which the second mobile device is worn.

6. The system of claim 1, wherein the garment device is formed of only passive element.

7. A system comprising:
a first mobile device having a control unit;
a second mobile device; and
a garment device;
wherein the garment device includes a first connection unit formed in a first area corresponding to a position on which a first mobile device is placed, a second connection unit formed at a position on which a second mobile device is placed, and a fabric cable electrically connected with the first connection unit and the second connection unit, wherein the control unit is configured to control one of a charging of the second mobile device from the first mobile device, and a charging of the first mobile device from the second mobile device based on a charging direction through the fabric cable, wherein the charging direction is determined based on a battery information of one of the first mobile device and the second mobile device, wherein the second connection unit includes a coil, and the control unit controls the first mobile unit to increase charging voltage so as to confirm a wireless charging standard between the second mobile unit and the second connection unit when the second mobile unit is charged from the first mobile unit.

8. The system of claim 7, wherein at least one of the first and second mobile devices includes a display, which displays an execution screen of the charging related application.

9. The system of claim 8, wherein the execution screen includes at least one of a battery charging information and a battery use quantity information.

10. The system of claim 7, wherein each of the first mobile device and the second mobile device includes an input unit which receives a user input related to the charging.

11. The system of claim 7, wherein at least one of the first mobile device and the second mobile device receives a user input related to at least one of a setting and release of a charging standby mode, a setting and release of a charging activation mode, and a setting and release of a charging through the input unit.

12. The system of claim 7, wherein the garment device is formed of only passive element.

* * * * *